(12) United States Patent
Khangar et al.

(10) Patent No.: US 7,637,703 B2
(45) Date of Patent: Dec. 29, 2009

(54) CUTTING TOOL

(75) Inventors: Abhijeet Khangar, West Allis, WI (US);
Jeffrey M. Zeiler, Hong Kong (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 76 days.

(21) Appl. No.: 11/716,081

(22) Filed: Mar. 9, 2007

(65) Prior Publication Data
US 2007/0212179 A1    Sep. 13, 2007

Related U.S. Application Data

(60) Provisional application No. 60/781,099, filed on Mar. 10, 2006.

(51) Int. Cl.
*B23B 51/04*    (2006.01)

(52) U.S. Cl. ....................... 408/204; 408/206

(58) Field of Classification Search .............. 408/203.5, 408/204–209, 703, 225, 227; *B23B 51/04, B23B 51/05*
See application file for complete search history.

(56) References Cited

U.S. PATENT DOCUMENTS

| | | | | |
|---|---|---|---|---|
| 2,444,099 A | * | 6/1948 | Hennessey, Jr. | 408/206 |
| 2,779,361 A | | 1/1957 | McKiff | |
| 2,794,469 A | | 6/1957 | Shortell | |
| 3,262,474 A | | 7/1966 | Enders | |
| 3,390,596 A | | 7/1968 | Trevathan | |
| 3,430,526 A | * | 3/1969 | Valenziano | 408/204 |
| 3,609,056 A | | 9/1971 | Hougen | |
| 3,648,508 A | * | 3/1972 | Hougen | 72/325 |
| 3,920,350 A | * | 11/1975 | Southall | 408/211 |
| 3,966,349 A | * | 6/1976 | Osman et al. | 408/204 |
| 4,108,567 A | * | 8/1978 | Faber | 408/224 |
| 4,129,400 A | * | 12/1978 | Wozar | 408/56 |
| 4,149,821 A | * | 4/1979 | Faber | 408/199 |
| 4,322,187 A | * | 3/1982 | Hougen | 408/204 |
| 4,352,610 A | * | 10/1982 | Yankovoy et al. | 408/1 R |
| 4,406,334 A | | 9/1983 | Baumann et al. | |
| 4,591,303 A | * | 5/1986 | Sato et al. | 408/206 |
| 4,693,644 A | * | 9/1987 | Takahashi | 408/204 |
| 4,859,123 A | * | 8/1989 | Koesashi et al. | 408/233 |
| 5,451,128 A | * | 9/1995 | Hattersley | 408/204 |
| 5,597,274 A | | 1/1997 | Behner | |
| 5,758,997 A | * | 6/1998 | Mealey et al. | 408/224 |
| 5,803,677 A | | 9/1998 | Brutscher et al. | |
| 5,813,802 A | | 9/1998 | Ajimi et al. | |
| 5,934,845 A | * | 8/1999 | Frey | 408/68 |

(Continued)

FOREIGN PATENT DOCUMENTS

DE    282475    8/1913

(Continued)

*Primary Examiner*—Daniel W Howell
(74) *Attorney, Agent, or Firm*—Michael Best & Friedrich LLP

(57) ABSTRACT

A cutting tool includes a tool body having a first end engageable with a workpiece and a second end engageable with a spindle of a power tool. The tool body includes first, second, and third gullets opening through a first end of the tool body and being spaced asymmetrically around a circumference of the first end. The cutting tool also includes a blade extending outwardly from the first end of the tool body adjacent to the first gullet.

26 Claims, 24 Drawing Sheets

U.S. PATENT DOCUMENTS

| | | |
|---|---|---|
| 6,379,090 B1 * | 4/2002 | Halley et al. ............... 408/227 |
| 6,599,063 B1 | 7/2003 | Capstran |
| 6,705,807 B1 | 3/2004 | Rudolph et al. |
| 6,786,684 B1 | 9/2004 | Ecker |
| 2002/0106254 A1 | 8/2002 | Rudolph |
| 2004/0042861 A1 | 3/2004 | Capstran |

FOREIGN PATENT DOCUMENTS

| | | | |
|---|---|---|---|
| DE | 2553035 A1 * | 6/1977 | |
| EP | 375526 A1 * | 6/1990 | |
| JP | 09066411 A * | 3/1997 | |
| JP | 09103906 A * | 4/1997 | |
| JP | 11058116 A * | 3/1999 | |
| JP | 11179720 | 7/1999 | |

* cited by examiner

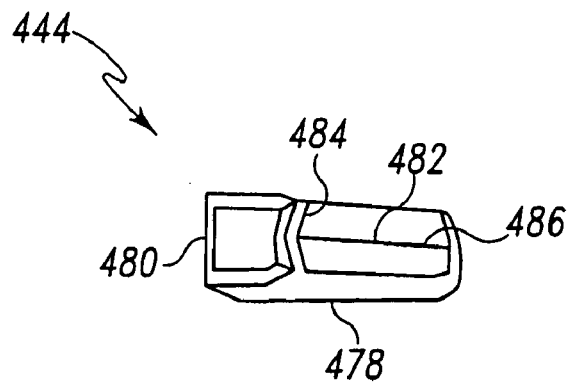
Fig. 18
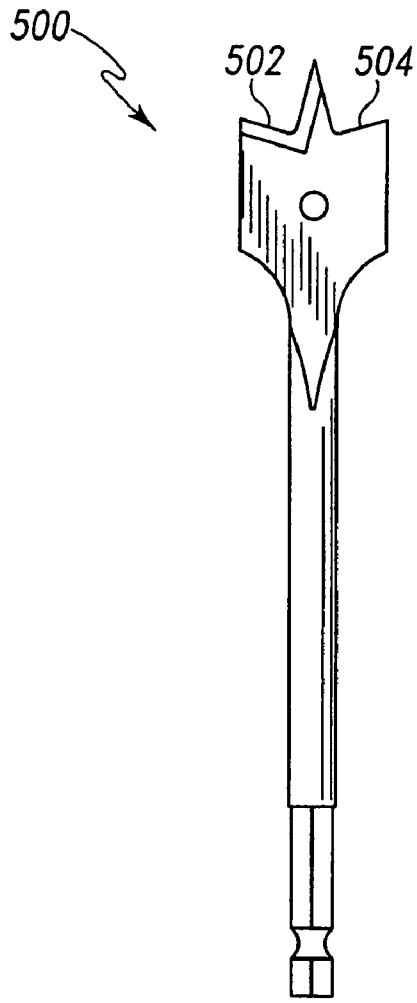 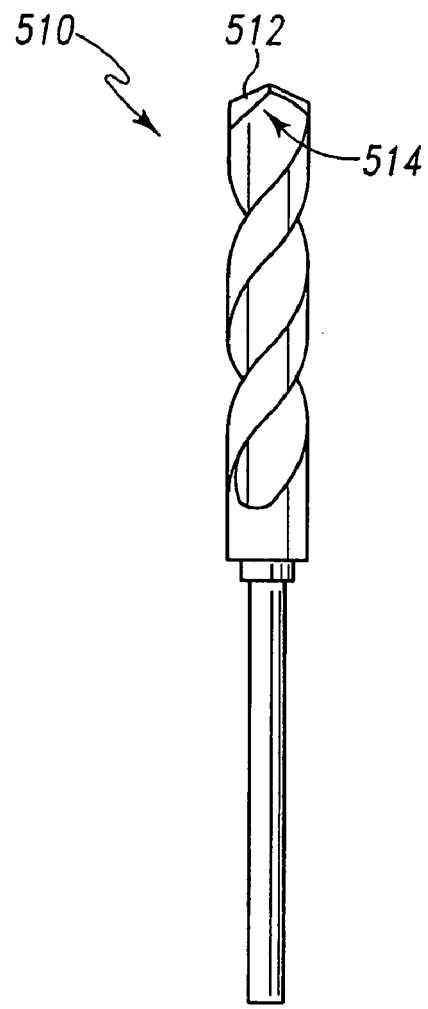
Fig. 19    Fig. 20

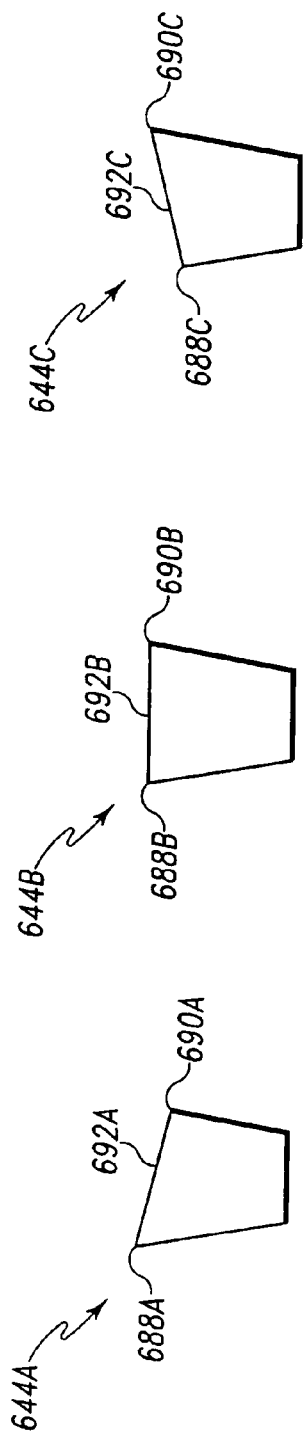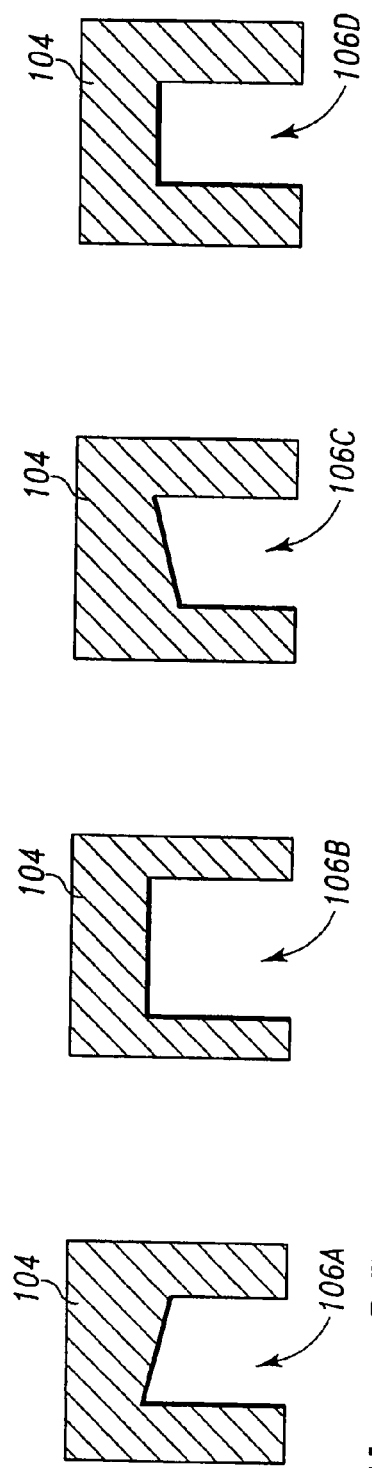

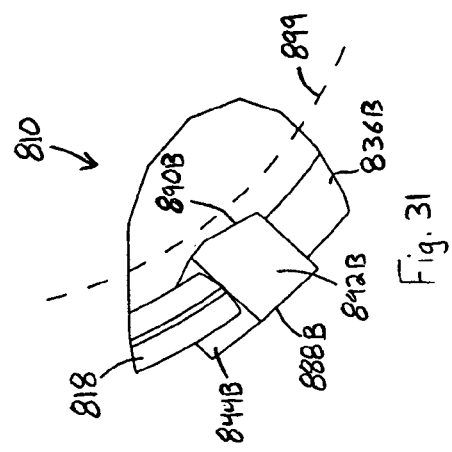
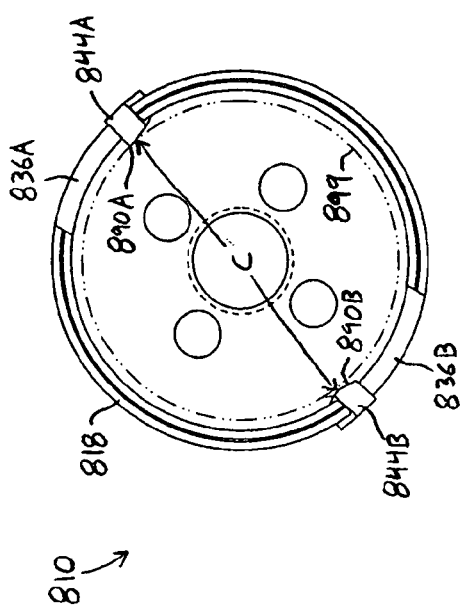
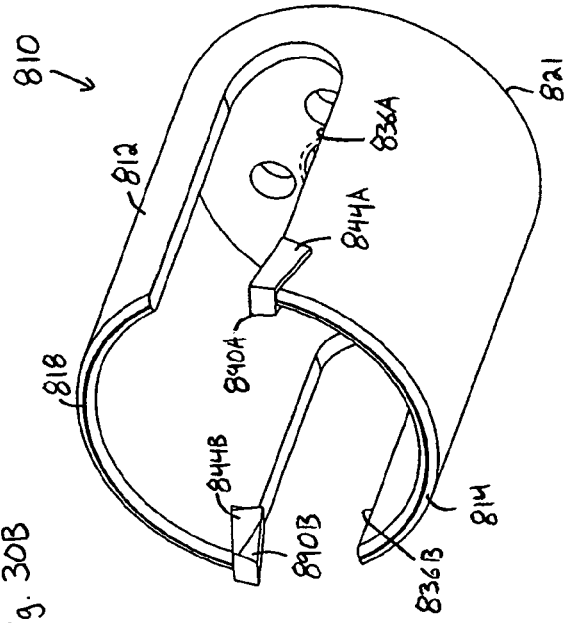

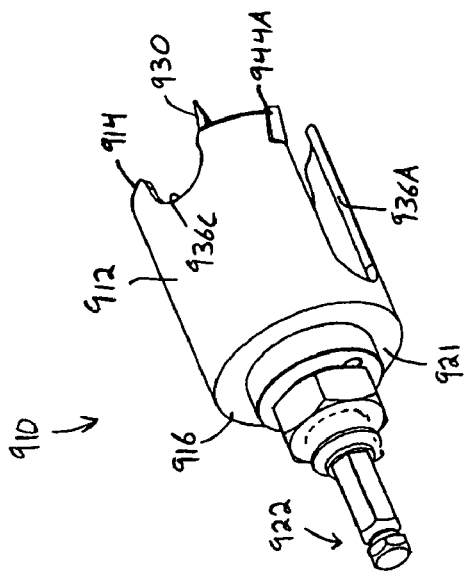
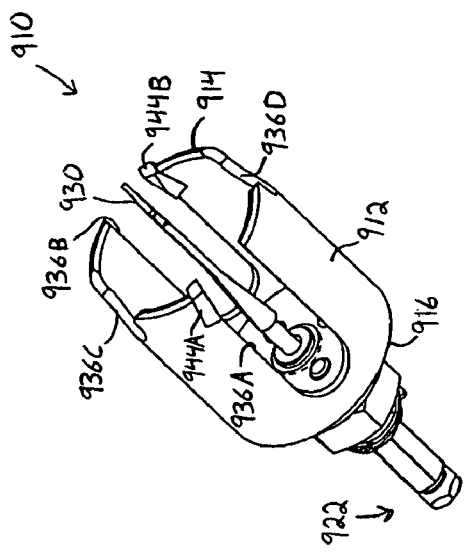
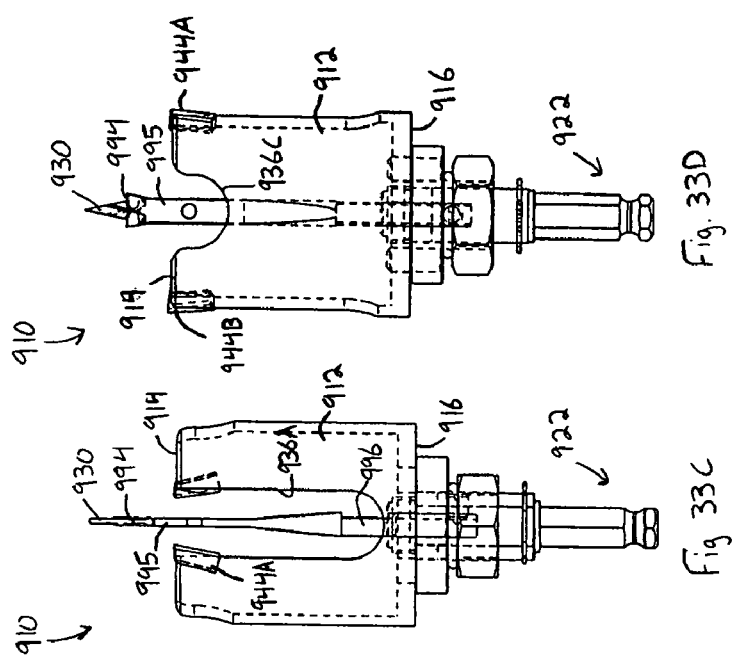

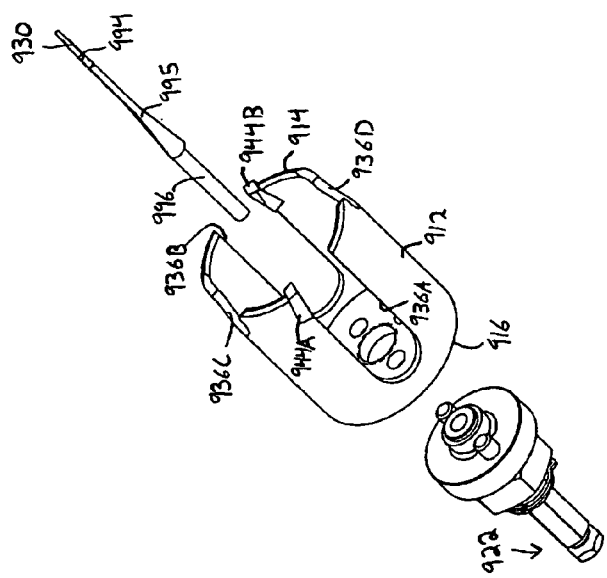
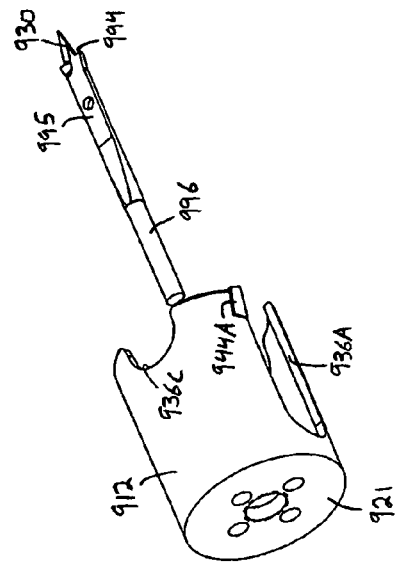
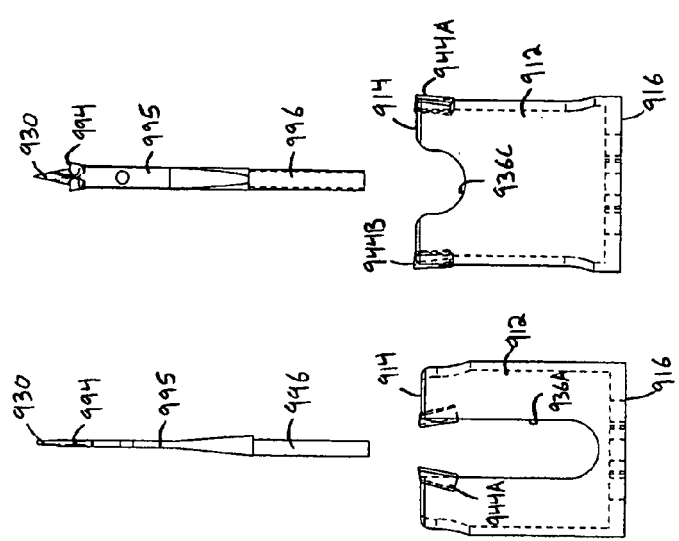
Fig. 34A
Fig. 34B
Fig. 34C
Fig. 34D

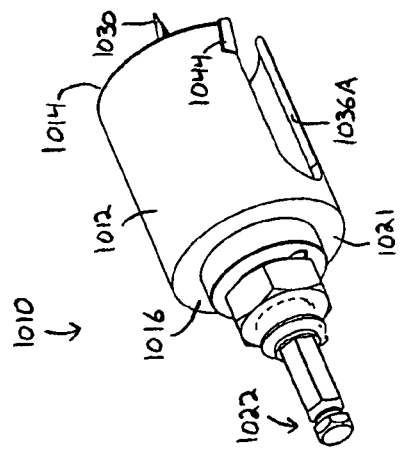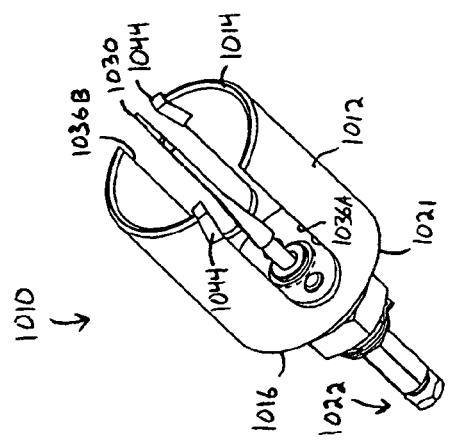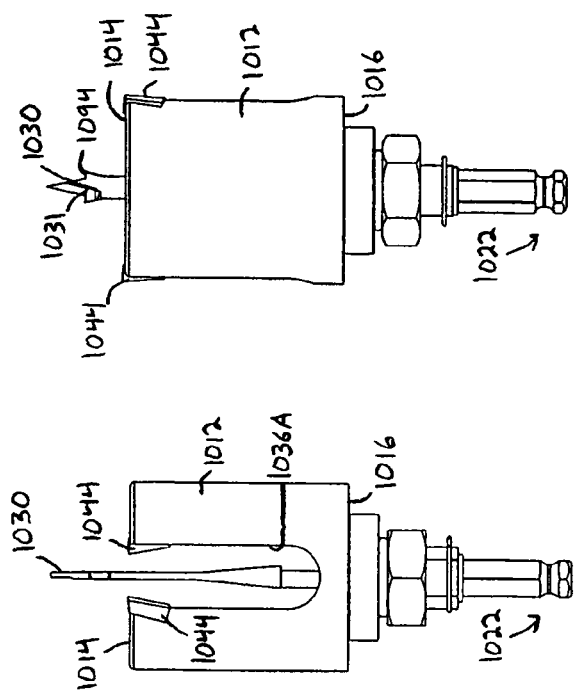

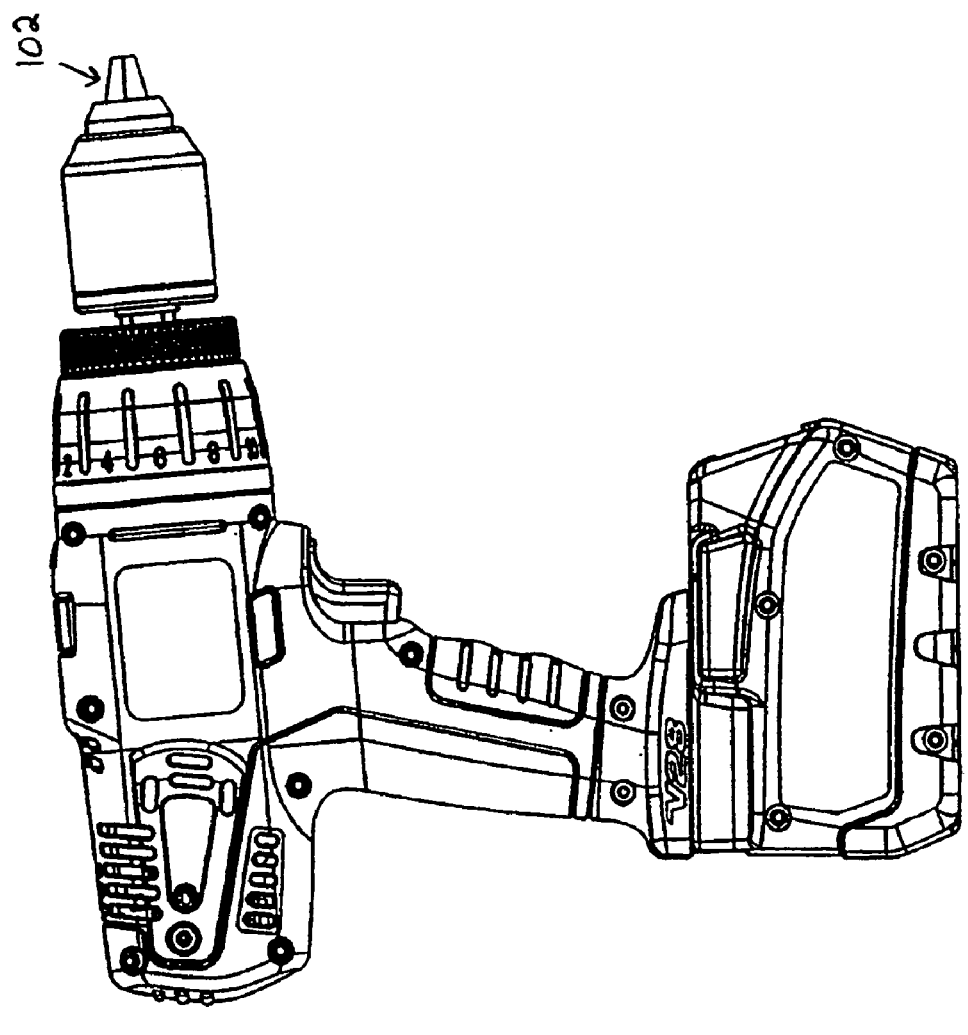

CUTTING TOOL

RELATED APPLICATIONS

The present application claims priority to U.S. Provisional Patent Application Ser. No. 60/781,099, filed Mar. 10, 2006, the entire contents of which are hereby incorporated by reference.

FIELD OF THE INVENTION

The present invention relates to cutting tools and, more particularly, to a rotary cutting tool for a power tool.

SUMMARY

In some embodiments, the invention provides a cutting tool for cutting a workpiece. The cutting tool can include a tool body having a first end and a second end and defining an axis extending through the first end and the second end, a rim extending circumferentially around the first end of the tool body, a first pair of openings extending axially through the body and opening through the rim, a second pair of openings extending axially through the tool body and opening through the rim, and a first blade supported on the rim adjacent to one of the first pair of openings, and a second blade supported on the rim adjacent to another of the first pair of openings. In some embodiments, the second pair of openings provides access to plugs cut from the workpiece and supported in the tool body. In some such embodiments, the one of the first pair of openings and the other of the first pair of openings are spaced circumferentially around the rim by about 180 degrees.

The present invention also provides a cutting tool including a tool body having a first end and a second end and defining an axis extending through the first end and the second end, a rim extending circumferentially around the first end of the tool body, and a blade removably supported on the rim. In some embodiments, one of the blade and the tool body defines a recess and an other of the blade and the tool body includes an outwardly extending projection engageable in the recess to secure the blade to the tool body. In some such embodiments, the projection is wedge-shaped.

The present invention further provides a cutting tool including a tool body having a first end engageable with a workpiece and a second end engageable with a spindle of a power tool. The tool body can include first, second, and third gullets that open through the first end of the tool body and can be spaced asymmetrically around a circumference of the first end. The cutting tool can also include a blade extending outwardly from the first end of the tool body adjacent to the first gullet.

The present invention also provides a cutting tool including a tool body having a first end engageable with a workpiece and a second end engageable with a spindle of a power tool. The cutting tool can also include a first blade extending outwardly from the first end of the tool body and including a cutting edge having a first width. The cutting tool can further include a second blade extending outwardly from the first end of the tool body and having a cutting edge with a second width. The first width can be greater than the second width.

The present invention further provides a cutting tool including a tool body having a first end, a second end, and an axis extending therebetween. The second end can be engageable with a spindle of a power tool. The cutting tool can also include a blade extending outwardly from the first end of the tool body and having a cutting edge. The cutting edge can be engageable with a workpiece to cut the workpiece. The cutting tool can also include a spade bit including a cutting edge and a drive shaft. The drive shaft can extend outwardly from the tool body beyond the first end of the tool body. The cutting edge can have a width greater than a width of the drive shaft.

The present invention also provides a cutting tool including a tool body having a first end engageable with a workpiece and a second end engageable with a spindle of a power tool. The tool body defines an axis extending between the first end and the second end. The cutting tool can also include a blade extending outwardly from the first end of the tool body and having a cutting edge sloping toward the second end of the tool body from a radially inner tip toward a radially outer tip.

Other aspects of the invention will become apparent by consideration of the detailed description and accompanying drawings.

BRIEF DESCRIPTION OF THE DRAWINGS

FIG. 18 is an enlarged view of the blade shown in FIG. 13.

FIG. 19 is a side view of a spade bit.

FIG. 20 is a side view of a twist bit.

FIG. 24A is an enlarged view of a blade of the cutting tool shown in FIG. 23.

FIG. 24B is an enlarged view of another blade of the cutting tool shown in FIG. 23.

FIG. 24C is an enlarged view of another blade of the cutting tool shown in FIG. 23.

FIG. 25A is a cross-sectional view of a workpiece cut using the blade shown in FIG. 24A.

FIG. 25B is a cross-sectional view of a workpiece cut using the blade shown in FIG. 24B.

FIG. 25C is a cross-sectional view of a workpiece cut using the blade shown in FIG. 24C.

FIG. 25D is a cross-sectional view of a workpiece cut using all of the blades shown in FIGS. 24A-24C.

FIG. 30A is a perspective view of a cutting tool according to another alternate embodiment of the present invention.

FIG. 30B is a front view of the cutting tool shown in FIG. 30A.

FIG. 31 is an enlarged perspective view of a portion of the cutting tool shown in FIG. 30A.

FIG. 33A is a front perspective view of a cutting tool according to another alternate embodiment of the present invention.

FIG. 33B is a rear perspective view of the cutting tool shown in FIG. 33A.

FIG. 33C is a side view of the cutting tool shown in FIG. 33A.

FIG. 33D is another side view of the cutting tool shown in FIG. 33A.

FIG. 34A is an exploded front perspective view of the cutting tool shown in FIG. 33A.

FIG. 34B is an exploded rear perspective view of the cutting tool shown in FIG. 33A.

FIG. 34C is an exploded side view of the cutting tool shown in FIG. 33A.

FIG. 34D is another exploded side view of the cutting tool shown in FIG. 33A.

FIG. 35A is a front perspective view of a cutting tool according to an alternate embodiment of the present invention.

FIG. 35B is a rear perspective view of the cutting tool shown in FIG. 35A.

FIG. 35C is a side view of the cutting tool shown in FIG. 35A.

FIG. 35D is another side view of the cutting tool shown in FIG. 35A.

FIG. 36 is a side view of a power tool for use with a cutting tool.

DETAILED DESCRIPTION

Figure 1:
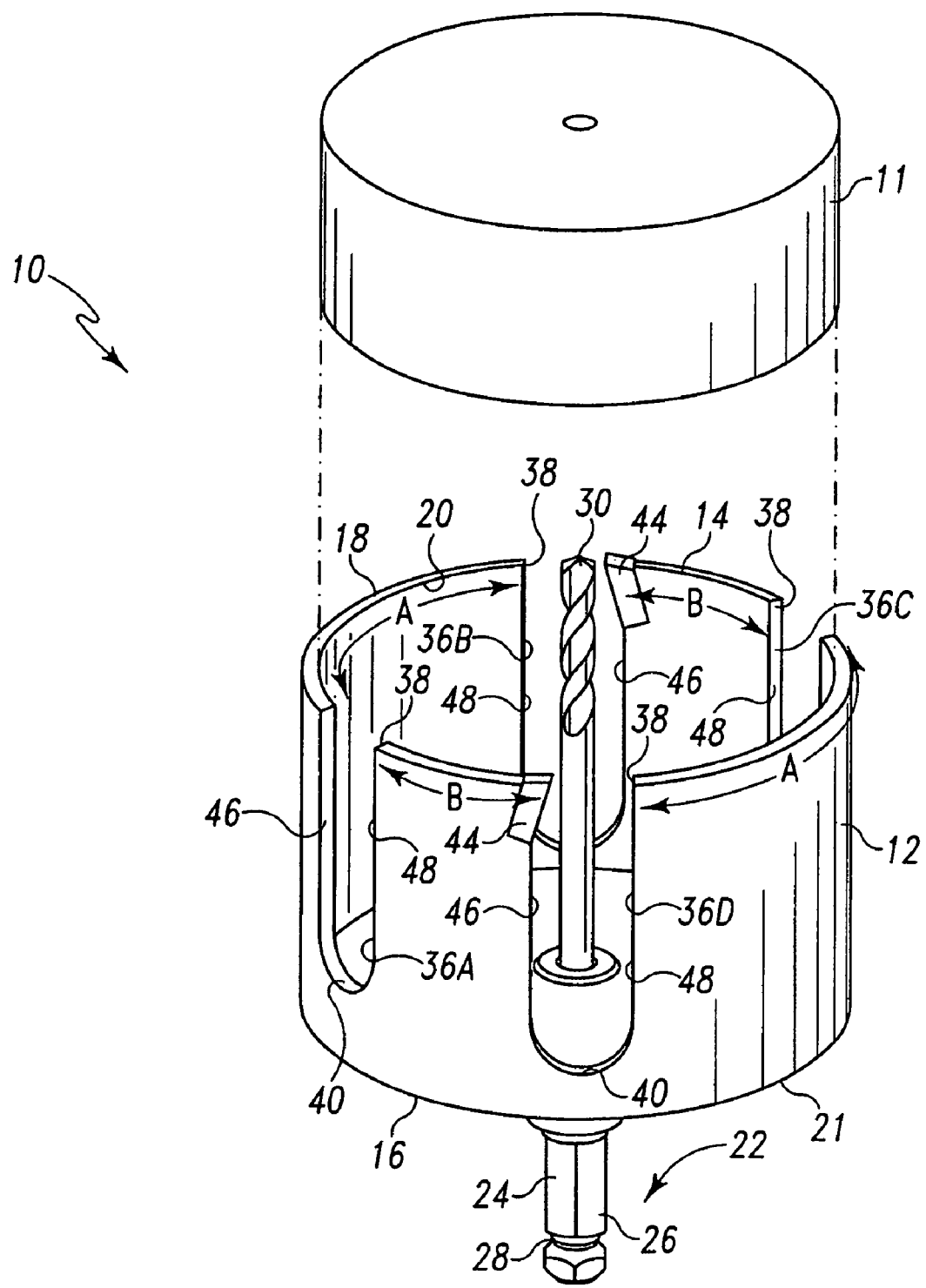
FIG. 1 is a front perspective view of a cutting tool according to some embodiments of the present invention and a plug cut from a workpiece by the cutting tool.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," and "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, it is to be understood that phraseology and terminology used herein with reference to device or element orientation (such as, for example, terms like "front," "rear," "top," "bottom," "lower", "up," "down," etc.) are only used to simplify description of the present invention, and do not alone indicate or imply that the device or element referred to must have a particular orientation. The elements of the present invention can be installed and operated in any orientation desired. In addition, terms such as "first", "second," and "third" are used herein for purposes of description and are not intended to indicate or imply relative importance or significance.

FIGS. 1-5 illustrate a cutting tool 10, such as, for example, a hole-saw, for operation with a power tool (e.g., a drill, a driver-drill, a screwdriver, and the like). In some embodiments, the power tool may be similar to, for example, the power tool 100 illustrated in FIG. 36. In some embodiments, the cutting tool 10 is operable to cut holes in a workpiece and/or to remove plugs 11 from the workpiece.

As shown in FIGS. 1-5, the cutting tool 10 includes a generally cylindrically-shaped body 12 having a first or workpiece-engaging end 14 and a second or rearward end 16. The first end includes a rim 18 defining an opening 20 and the second end 16 includes a base 21.

A connecting structure 22 is supported on the second end 16 of the body 12 and includes an elongated rearwardly-extending drive shaft 24 configured to be received in a chuck or spindle of a power tool. For example, the connecting structure 22 may be received by a spindle 102 of the power tool 100 illustrated in FIG. 36. In some embodiments, such as the illustrated embodiment of FIGS. 1-5, fasteners can be used to secure the connecting structure 22 to the body 12 of the cutting tool 10. In other embodiments, the body 12 and the connecting structure 22 can be integrally formed.

In the illustrated embodiment of FIGS. 1-5, the drive shaft 24 has a substantially hexagonal cross-sectional shape and includes six flat sides 26. In other embodiments, the drive shaft 24 can have other cross-sectional shapes, such as, for example, round, triangular, rectangular, trapezoidal, or any other polygonal shape, oval, irregular, and the like and can include one or more flat sides 26.

In the illustrated embodiment of FIGS. 1-5, the connecting structure 22 also includes a groove 28 extending circumferentially around a rearward end of the drive shaft 24 for engagement with locking elements in a chuck or spindle of a power tool. In other embodiments, the connecting structure 22 can include other recesses and protrusions and combinations of recesses and protrusions for engagement with locking elements in chucks of power tools for securing the cutting tool 10 to the power tool.

In some embodiments, such as the illustrated embodiment of FIGS. 1-5, a bit 30 extends forwardly from the first end 14 of the body 12 and outwardly from the body 12 beyond the rim 18. In the illustrated embodiment of FIGS. 1-5, the bit 30 is configured as a twist drill bit and is generally aligned with the drive shaft 24 along a longitudinal axis 32. In other embodiments, the bit 30 and the drive shaft 24 can have other relative orientations and can other configurations, such as, for example, a spade bit configuration, ship auger bit configuration, etc.

As shown in FIGS. 1-5, openings or gullets 36 can be spaced circumferentially around the body 12 and can extend axially through the body 12 from the rim 18 toward the base 21. In the illustrated embodiment of FIGS. 1-5, the body 12 includes four gullets 36 with a first gullet 36A being spaced a distance A from a second, adjacent gullet 36B, the second gullet 36B being spaced a second distance B from a third gullet 36C, the third gullet 36C being spaced the first distance A from a forth gullet 36D, and the fourth gullet 36D being spaced the second distance B from the first gullet 36A. In the illustrated embodiment of FIGS. 1-5, the first distance A is substantially greater than the second distance B. In other embodiments, the body 12 can include five or more gullets 36 spaced at regular or irregular intervals around the circumference of the body 12.

As shown in FIGS. 1-5, each of the gullets 36A-36D includes an open first end 38 opening through the rim 18 and a closed second end 40. In the illustrated embodiment of FIGS. 1-5, the second ends 40 of the gullets 36A-36D are generally arcuately shaped and are positioned adjacent to the base 21 of the body 12. In other embodiments, the second ends 40 can have any other shape desired, such as, for example, flat, sloped, angled, pointed, irregular, and the like and can be positioned at any point between the first and second ends 14, 16 of the body 12.

In the illustrated embodiment of FIGS. 1-5, cutting blades 44 are supported on the first end 14 of the body 12 adjacent to the second and forth gullets 36B, 36D. In embodiments such as the illustrated embodiment in which the cutting tool 10 is rotated about the axis 32 in a counterclockwise direction, the cutting blades 44 are located adjacent to trailing edges 46 of the second and fourth gullets 36B, 36D. In other embodiments, the cutting tool 10 can include one, three, four, or more cutting blades 44 positioned circumferentially around the rim 18 at regular or irregular intervals. In these other embodiments, the cutting blades 44 can be positioned adjacent to leading edges 48 of the gullets 36, the trailing edges 46 of the gullets 36, or at any other position around the circumference of the rim 18.

Figure 2:
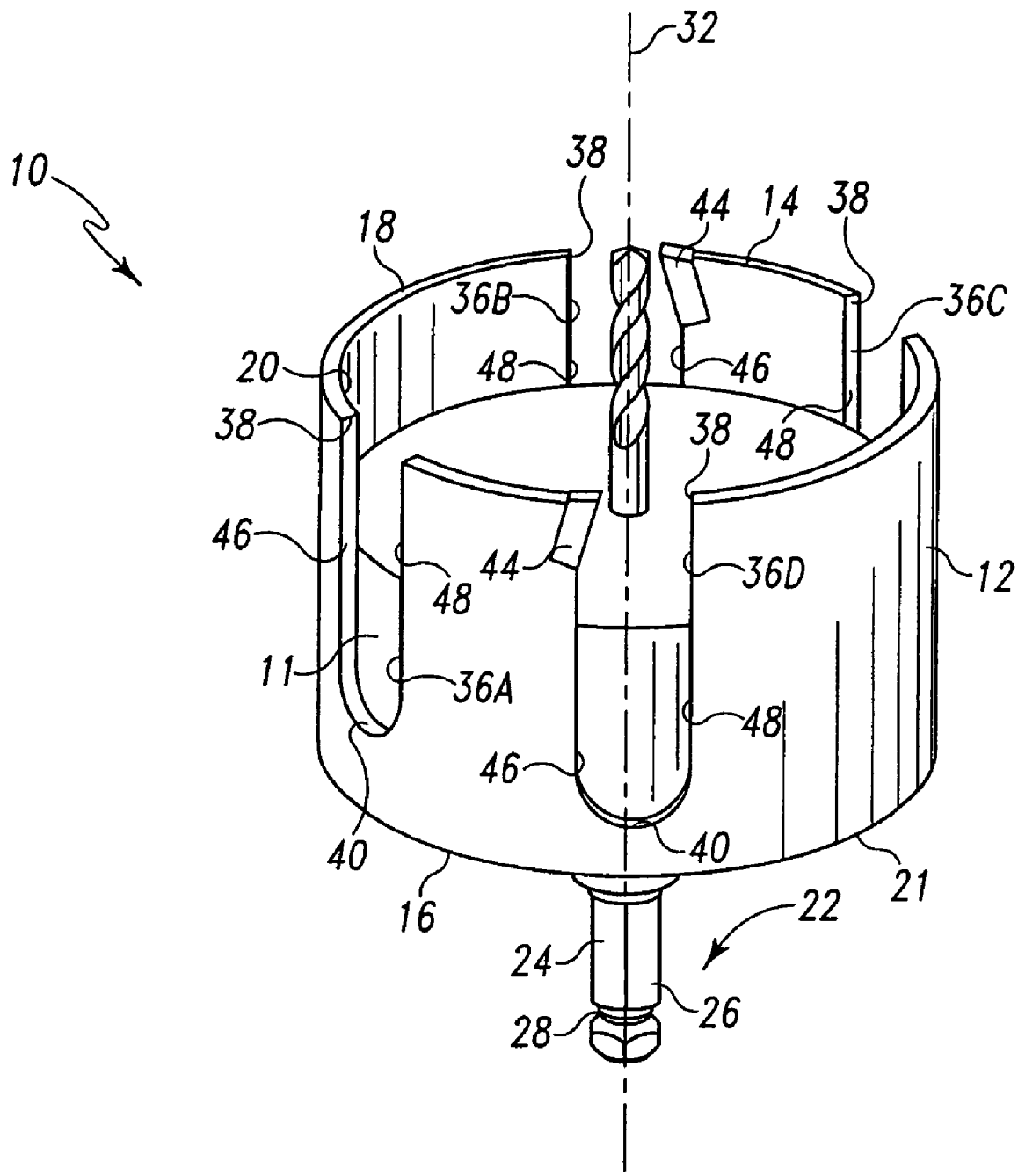
FIG. 2 is another front perspective view the cutting tool shown in FIG. 1 with the plug supported in the cutting tool.
Figure 3:
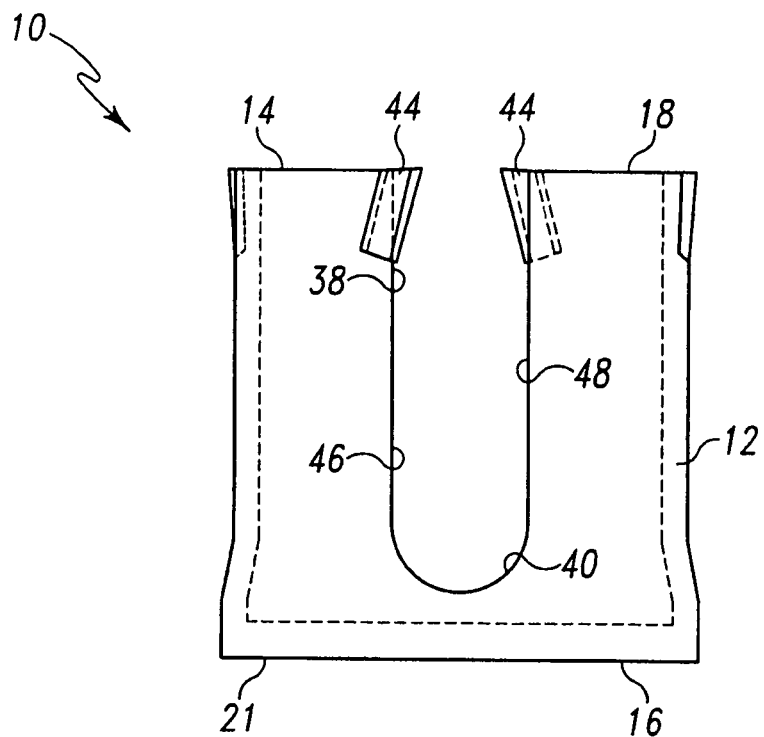
FIG. 3 is a side view of a portion of the cutting tool shown in FIG. 1.
Figure 4:
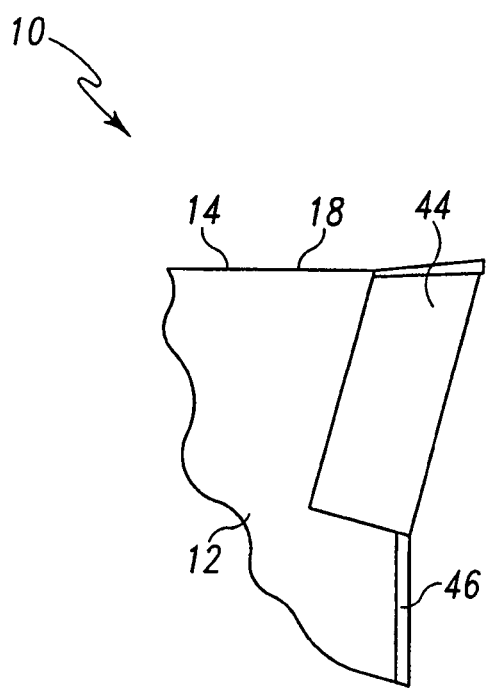
FIG. 4 is an enlarged side view of a portion of the cutting tool shown in FIG. 1.
Figure 5:
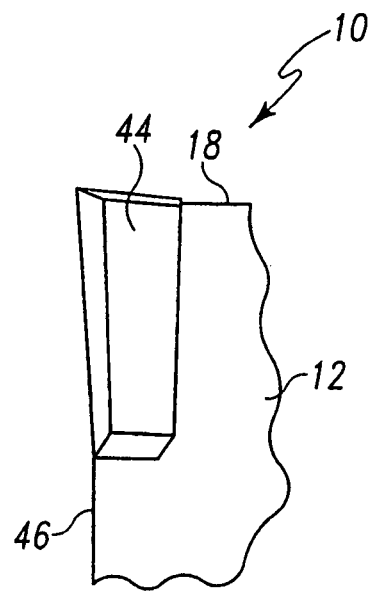
FIG. 5 is an enlarged side view of a portion of the cutting tool shown in FIG. 1.
Figure 6:
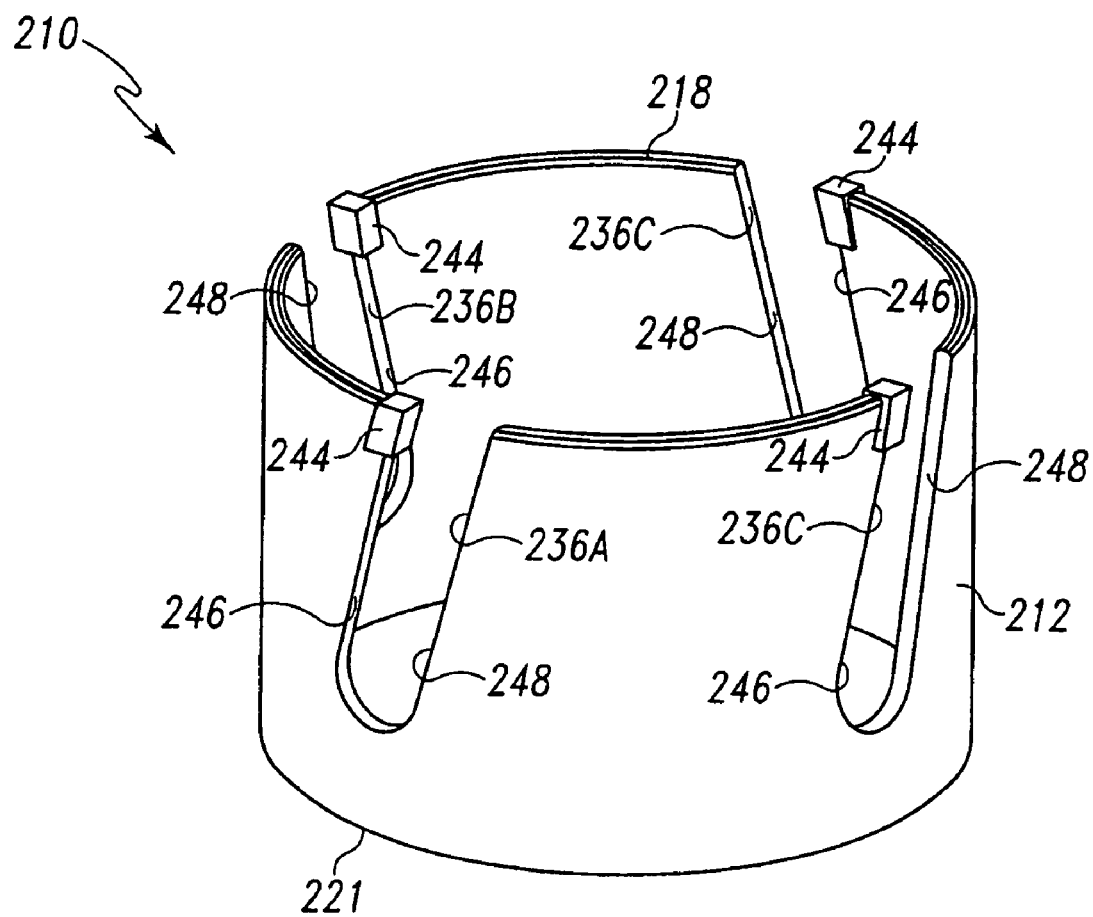
FIG. 6 is a perspective view of a cutting tool according to an alternate embodiment of the present invention.
Figure 7:
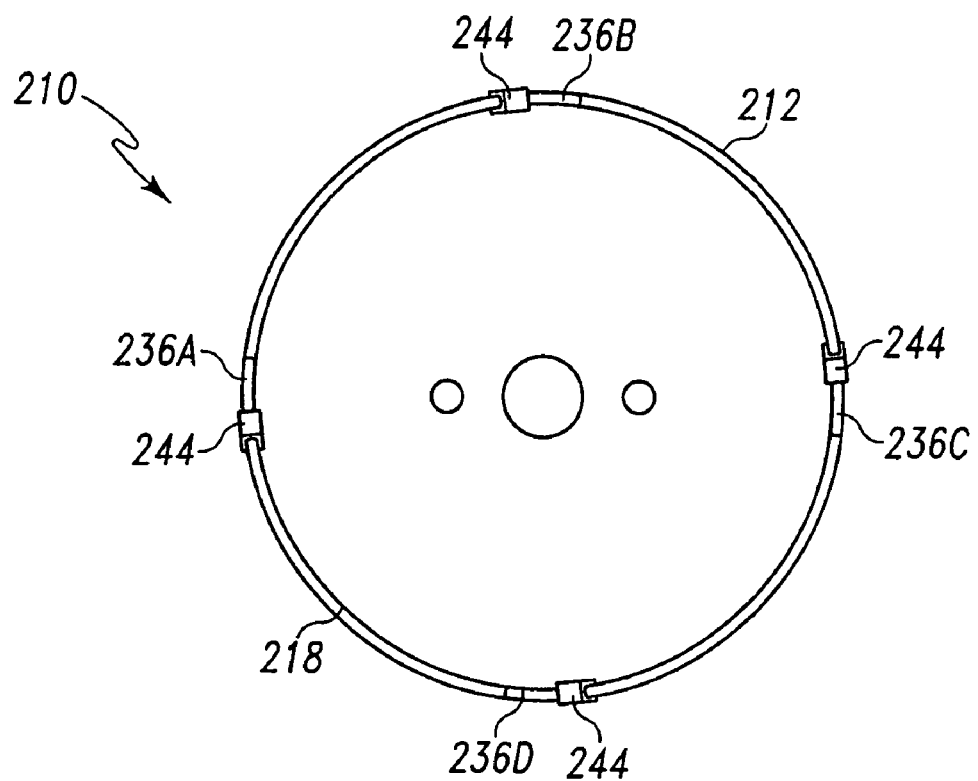
FIG. 7 is a front view of the cutting tool shown in FIG. 6.
Figure 8:
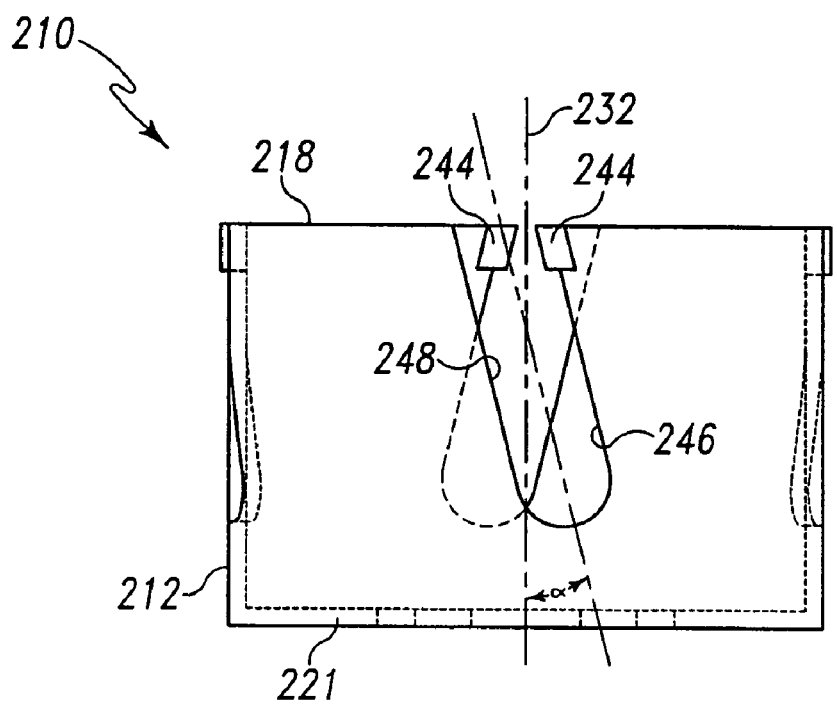
FIG. 8 is a side view of the cutting tool shown in FIG. 6.
Figure 9:
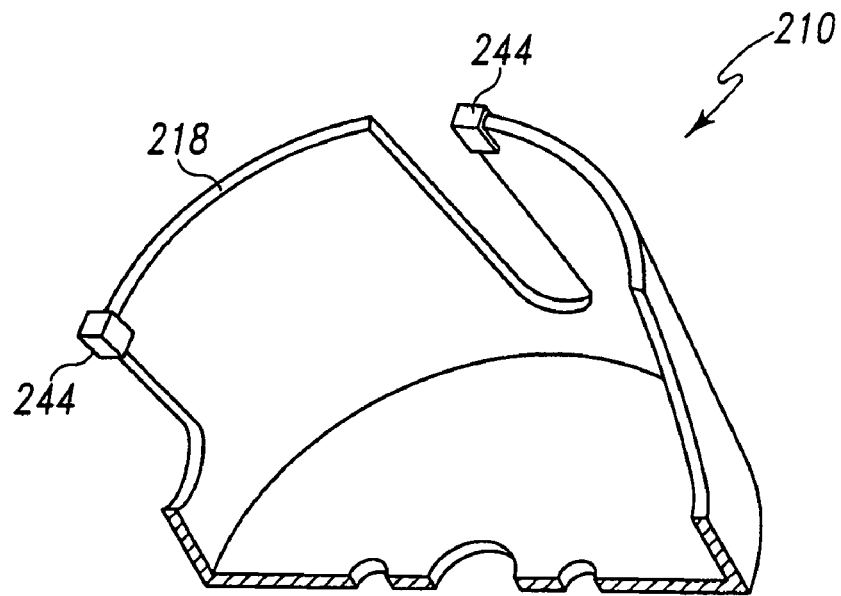
FIG. 9 is perspective view of a portion of the cutting tool shown in FIG. 6.
Figure 10:
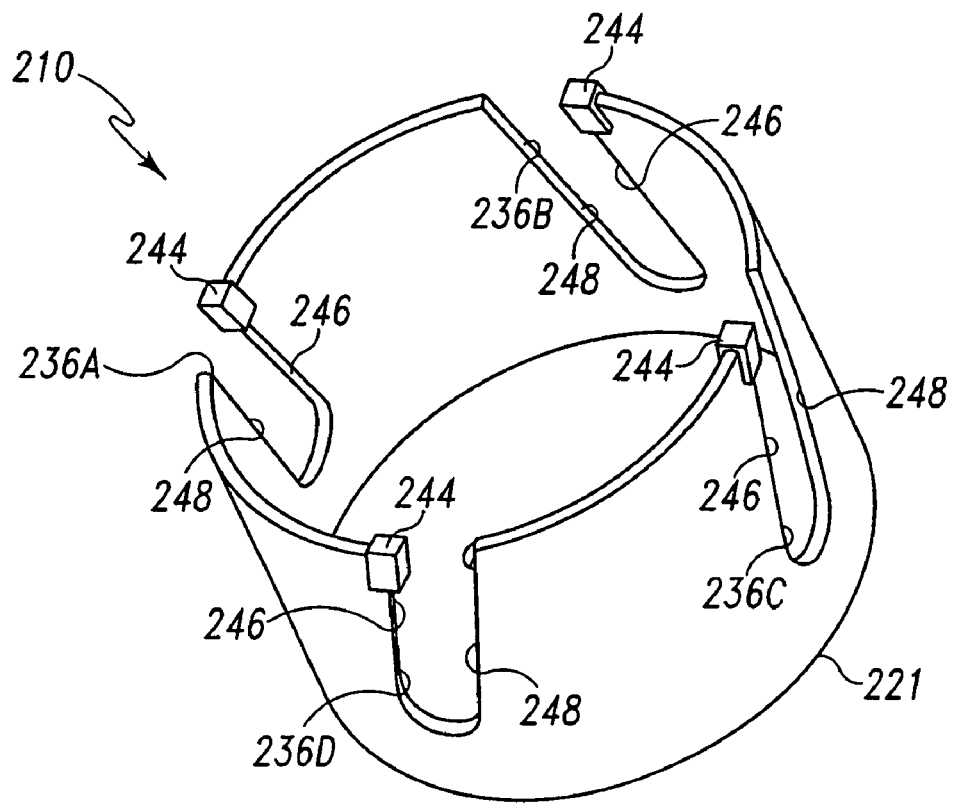
FIG. 10 is a perspective view of the cutting tool shown in FIG. 6.

In some embodiments, blades 44 are not positioned adjacent to one or more of the gullets 36. For example, in the illustrated embodiment of FIGS. 1-5, the trailing and leading edges 46, 48 of the first and third gullets 36A, 36C are relatively smooth and do not include blades 44. In these embodiments, an operator can insert his fingers through the first and third gullets 36A, 36C and into the body 12 to remove chips or plugs 11 without contacting the blades 44. More particularly, as shown in FIGS. 1-2, in some embodiments, the cutting tool 10 can be used to remove a plug 11 from a workpiece. In these embodiments, after the cutting operation is complete, an operator can grasp the plug 11 through the second and fourth gullets 36B, 36D and remove the plug 11 from the body 12 before resuming operation of the cutting tool 10.

During operation, an operator secures the connecting structure 22 of the cutting tool 10 to a power tool and positions the cutting tool 10 above a workpiece. The operator then centers the bit 30 above the intended cutting location and activates the power tool to rotate the cutting tool 10 about the axis 32 of the drive shaft 24. As the cutting tool 10 rotates, the bit 30 drills a locating hole in the workpiece and orients the body 12 of the cutting tool 10 in a desired position above the workpiece.

Continued forward movement of the cutting tool 10 moves the blades 44 into engagement with the workpiece. As the blades 44 rotate, the blades 44 cut a circular path in the workpiece. Chips and sawdust formed during cutting are directed radially outwardly through the gullets 36. After a hole is cut in the workpiece, the operator can remove the plug and/or chips from the body 12 of the cutting tool 10 as described above.

FIGS. 6-10 illustrate an alternate embodiment of a cutting tool 210 according to the present invention. The cutting tool 210 shown in FIGS. 6-10 is similar in many ways to the illustrated embodiments of FIGS. 1-5 described above. Accordingly, with the exception of mutually inconsistent features and elements between the embodiment of FIGS. 6-10 and the embodiments of FIGS. 1-5, reference is hereby made to the description above accompanying the embodiments of FIGS. 1-5 for a more complete description of the features and elements (and the alternatives to the features and elements) of the embodiment of FIGS. 6-10. Features and elements in the embodiment of FIGS. 6-10 corresponding to features and elements in the embodiments of FIGS. 1-5 are numbered in the 200 series.

In the illustrated embodiment of FIGS. 6-10, the cutting tool 210 includes four openings or gullets 236 spaced circumferentially around the body 212. The gullets 236 extend axially through the body 212 from the rim 218 toward the base 221 and are oriented at a non-perpendicular angle a with respect to the base 221 of the cutting tool 210. More specifically, the leading edges 248 of the gullets 236 are oriented at an angle $\alpha$ of between about 30 degrees and about 60 degrees with respect to the base 221 of the cutting tool 210. For example, in some embodiments, the gullets 236 are oriented at a non-perpendicular angle $\alpha$ with respect to the axis 232 extending perpendicularly from the base 212.

In some embodiments, such as the illustrated embodiment of FIGS. 6-10, cutting blades 244 are supported on the first end 214 of the body 212 adjacent to each of the first, second, third, and fourth gullets 236A, 236B, 236C, 236D. In other embodiments, the cutting tool 210 can include one, two, three, five, or more cutting blades 244 positioned adjacent to the leading or trailing edges 248, 246 of the gullets 236 or at any other location around the circumference of the rim 218.

During operation, chips cut from the workpiece are directed radially outwardly through the gullets 236. In some embodiments, such as the illustrated embodiment of FIGS. 6-10 in which the gullets 236 are oriented at a non-perpendicular angle $\alpha$ with respect to the base 221 of the body 212, chips cut from the workpiece travel circumferentially toward a downstream gullet 236 before being directed radially outwardly through the gullet 236 and out of the body 212.

Figure 11:
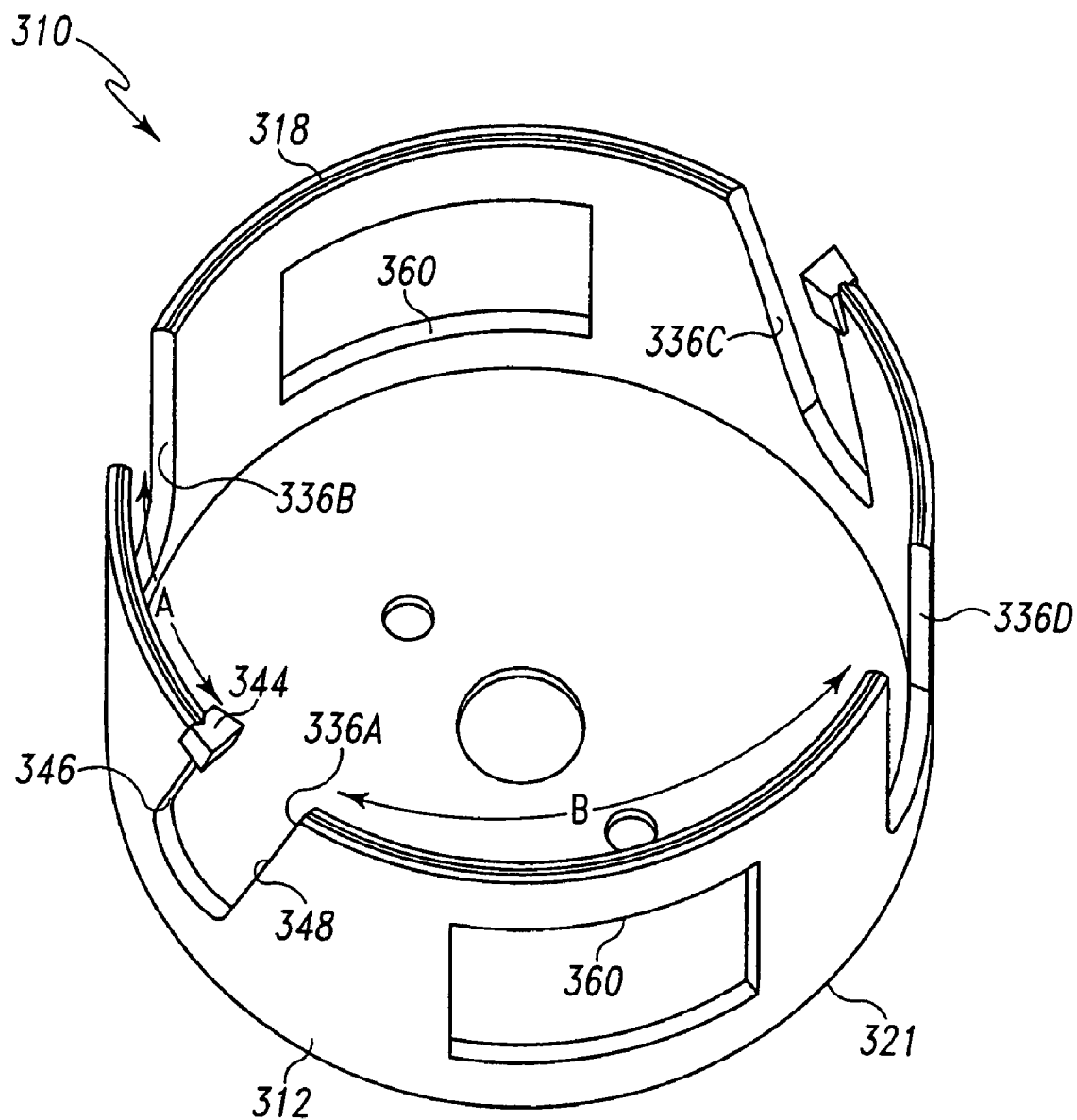
FIG. 11 is a perspective view of a cutting tool according to another alternate embodiment of the present invention.
Figure 12:
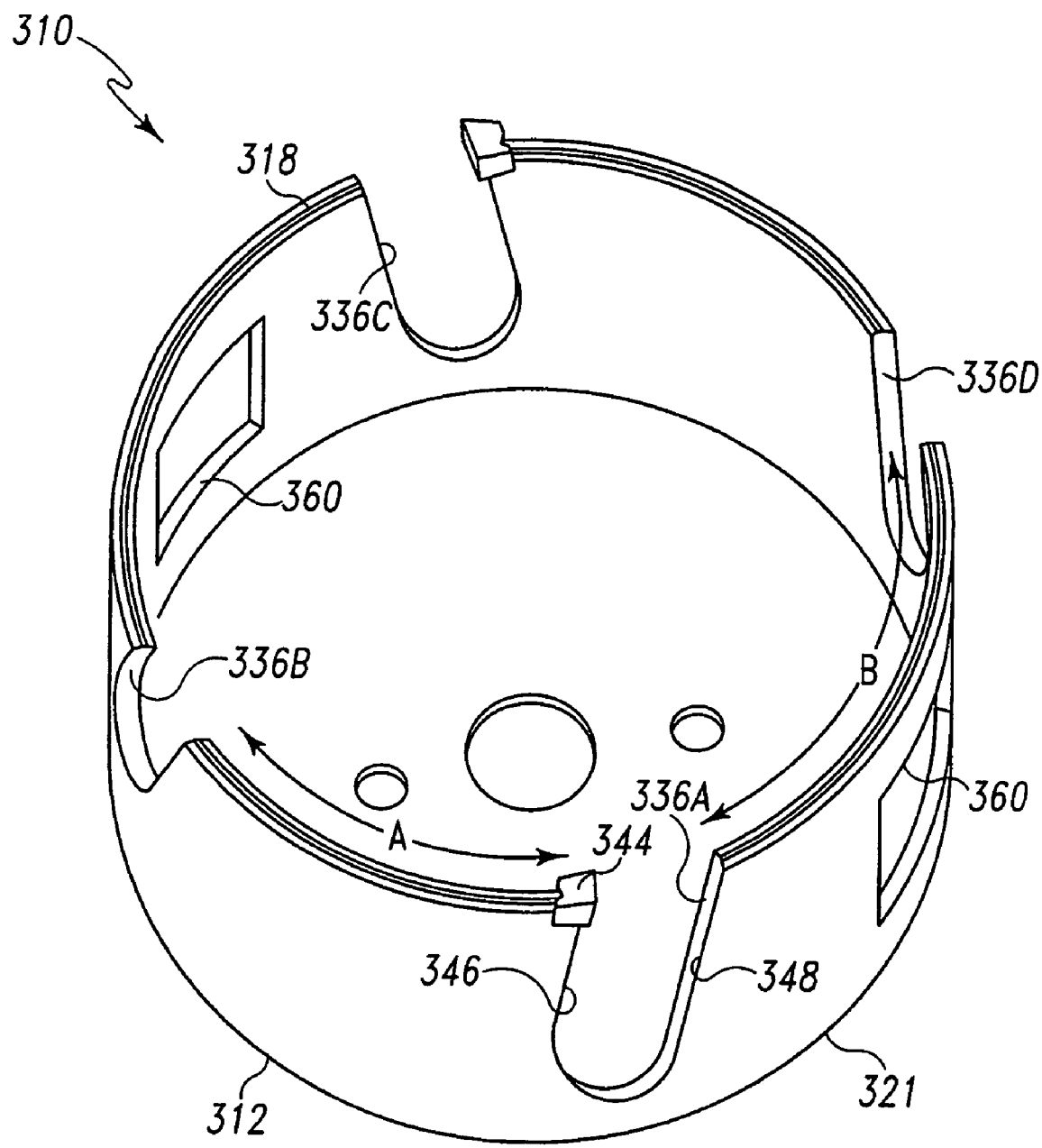
FIG. 12 is another perspective view of the cutting tool shown in FIG. 11.
Figure 13:
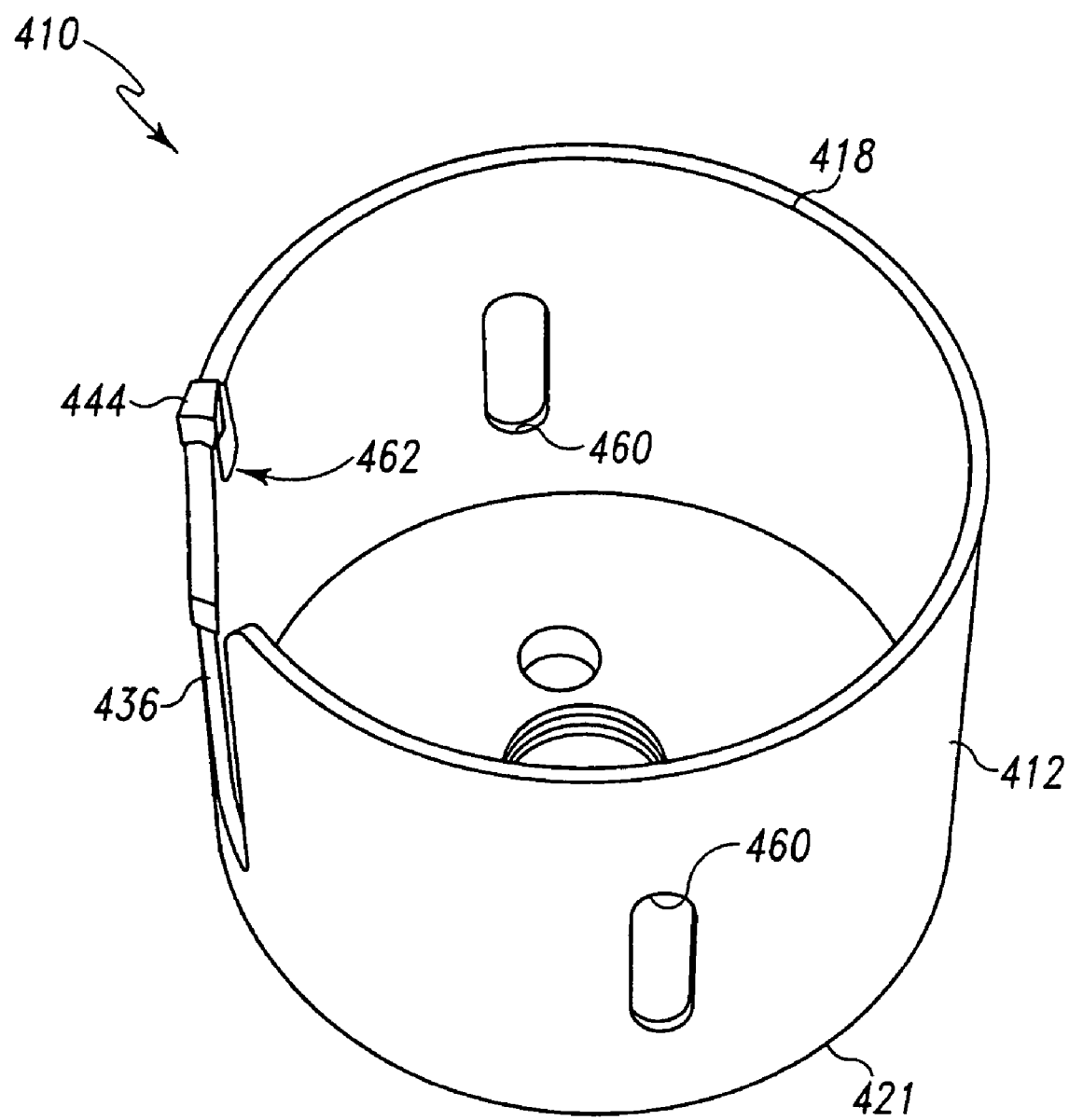
FIG. 13 is a perspective view of a cutting tool according to another alternate embodiment of the present invention.
Figure 14:
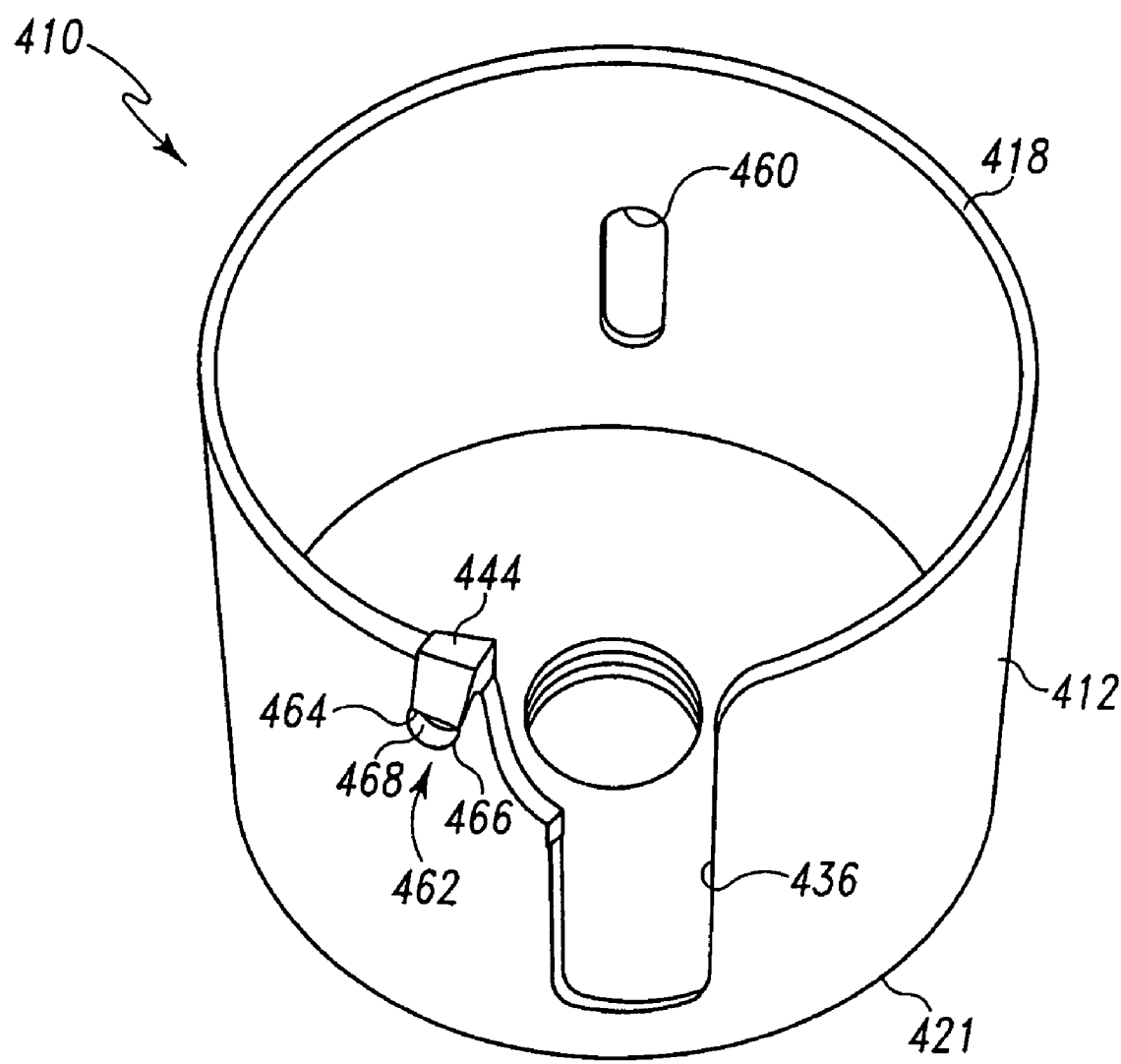
FIG. 14 is another perspective view of the cutting tool shown in FIG. 13.
Figure 15:
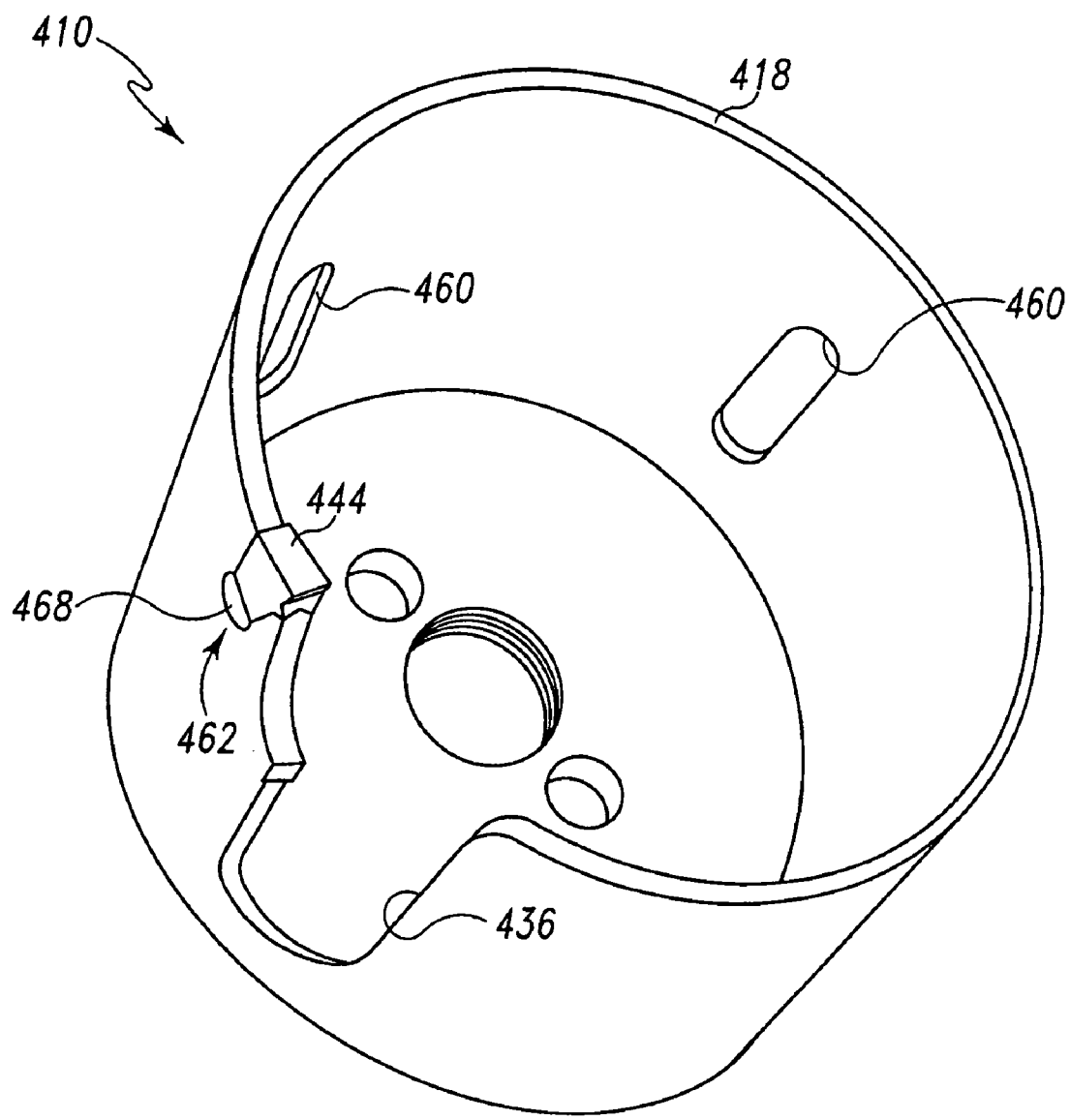
FIG. 15 is an enlarged perspective view of the cutting tool shown in FIG. 13 supporting a blade.

FIGS. 11 and 12 illustrate an alternate embodiment of a cutting tool 310 according to the present invention. The cutting tool 310 shown in FIGS. 11 and 12 is similar in many ways to the illustrated embodiments of FIGS. 1-10 described above. Accordingly, with the exception of mutually inconsistent features and elements between the embodiment of FIGS. 11 and 12 and the embodiments of FIGS. 1-10, reference is hereby made to the description above accompanying the embodiments of FIGS. 1-10 for a more complete description of the features and elements (and the alternatives to the features and elements) of the embodiment of FIGS. 11 and 12. Features and elements in the embodiment of FIGS. 11 and 12 corresponding to features and elements in the embodiments of FIGS. 1-10 are numbered in the 300 series.

As shown in FIGS. 11 and 12, the cutting tool 310 can include first, second, third and fourth gullets 336A, 336B, 336C, 336D spaced circumferentially around the rim 318 and extending through the body 312. In the illustrated embodiment of FIGS. 11 and 12, the first and third gullets 336A, 336C are spaced apart by about 180 degrees and are oriented at a non-perpendicular angle of between about 30 degrees and about 60 degrees with respect to the base 321 of the body 312. The second and fourth gullets 336B, 336D are spaced apart by about 180 degrees and are oriented at a perpendicular angle with the respect to the base 321 of the body 312.

In some embodiments, such as the illustrate embodiment of FIGS. 11 and 12 the first gullet 336A is spaced a distance A from the second gullet 336B, the second gullet 336B is spaced a second distance B from the third gullet 336C, the third gullet 336C is spaced the first distance A from the forth gullet 336D, and the fourth gullet 336D is spaced the second distance B from the first gullet 36A. In the illustrated embodiment of FIGS. 11 and 12, the second distance B is substantially greater than the first distance A. In other embodiments, the body 12 can include five or more gullets 336 spaced at regular or irregular intervals around the circumference of the body 312.

In the illustrated embodiment of FIGS. 11 and 12, cutting blades 344 are supported on the first end 314 of the body 312 adjacent to the first and third gullets 336A, 336C. In embodiments such as the illustrated embodiment in which the cutting tool 310 is rotated in a counterclockwise direction, the cutting blades 344 are located adjacent to trailing edges 346 of the first and third gullets 336A, 336C. In other embodiments, the cutting tool 310 can include one, three, four, or more cutting blades 344 positioned circumferentially around the rim 318 at regular or irregular intervals. In these other embodiments, the cutting blades 344 can be positioned adjacent to leading edges 348 of the gullets 336, the trailing edges 346 of the gullets 336, or at any other position around the circumference of the rim 318.

As shown in FIGS. 11 and 12, the body 312 of the cutting tool 310 can also include openings 360 positioned between the gullets 336. The openings 360 extend radially through the body 312 and communicate between the interior and the exterior of the body 312 and facilitate the removal of plugs and chips from the body 312.

FIGS. 13-18 illustrate an alternate embodiment of a cutting tool 410 according to the present invention. The cutting tool 410 shown in FIGS. 13-18 is similar in many ways to the illustrated embodiments of FIGS. 1-12 described above. Accordingly, with the exception of mutually inconsistent features and elements between the embodiment of FIGS. 13-18 and the embodiments of FIGS. 1-12, reference is hereby made to the description above accompanying the embodiments of FIGS. 1-12 for a more complete description of the features and elements (and the alternatives to the features and elements) of the embodiment of FIGS. 13-18. Features and elements in the embodiment of FIGS. 13-18 corresponding to features and elements in the embodiments of FIGS. 1-12 are numbered in the 400 series.

Figure 16:
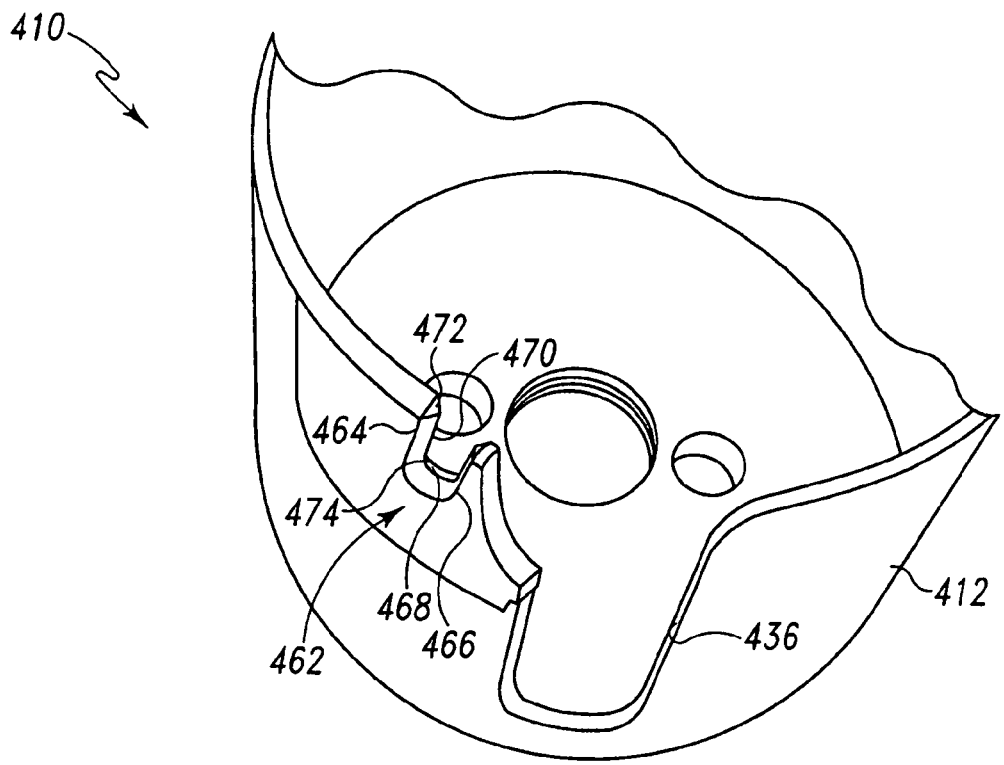
FIG. 16 is an enlarged perspective view of a portion of the cutting tool shown in FIG. 13 with the blade removed.
Figure 17:
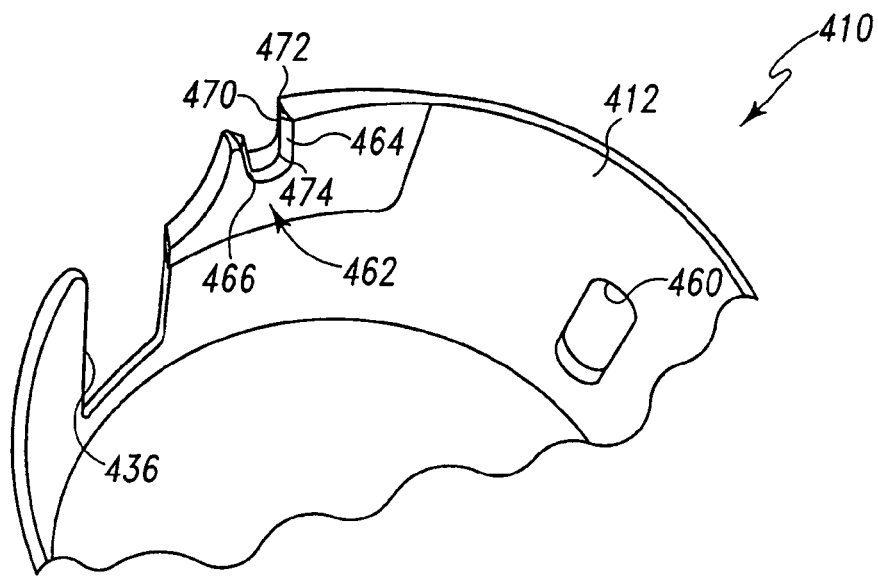
FIG. 17 is an enlarged front view of a portion of the cutting tool shown in FIG. 13 with the blade removed.

As shown in FIGS. 13-18, the cutting tool 410 can include a tool holder 462 supported on the first end 414 of the body 412 adjacent to a gullet 436 for supporting a removable cutting blade 444. In the illustrated embodiment of FIGS. 13-18, the tool holder 462 includes opposed first and second fingers 464, 466 and an opening 468 defined between the first and second fingers 464, 466. Tracks 470 extend along the interior sides of the first and second fingers 464, 466. As shown in FIGS. 16 and 17, the tracks 470 can have a substantially V-shaped cross-sectional shape and can slope inwardly from a first end 472 toward a second end 474. In other embodiments, one or both of the tracks 470 can have any other cross-sectional shape desired, such as, for example, square, triangular, rectangular, trapezoidal, or any other polygonal shape, arcuate, irregular, and the like.

In some embodiments, such as the illustrated embodiment of FIGS. 13-18, the blade 444 can include a blade body 478 having a cutting edge 480 and tracks 482 extending along the exterior edges of the blade body 478 for engagement with the tool holder 462 of the cutting tool 410. In the illustrated embodiment of FIGS. 13-18, the tracks 482 of the blade 444 have a substantially V-shaped cross-sectional shape and slope inwardly from a first end 484 toward a second end 486 for locking engagement with correspondingly shaped tracks 470 on the tool holder 462 to secure the blade 444 to the tool body 412. In other embodiments, one or both of the tracks 482 can have any other cross-sectional shape desired, such as, for example, square, triangular, rectangular, trapezoidal, or any other polygonal shape, arcuate, irregular, and the like. In still other embodiments, one or both of the blade 444 and the tool holder 462 can include a magnet and/or can be magnetized to secure the blade 444 to the tool holder 462.

In embodiments such as the illustrated embodiment of FIGS. 13-18 having a removable blade 444, an operator can remove damaged or worn blades 444 and replace the damaged or worn blades 444 to maintain a relatively sharp cutting edge 480.

Figure 21:
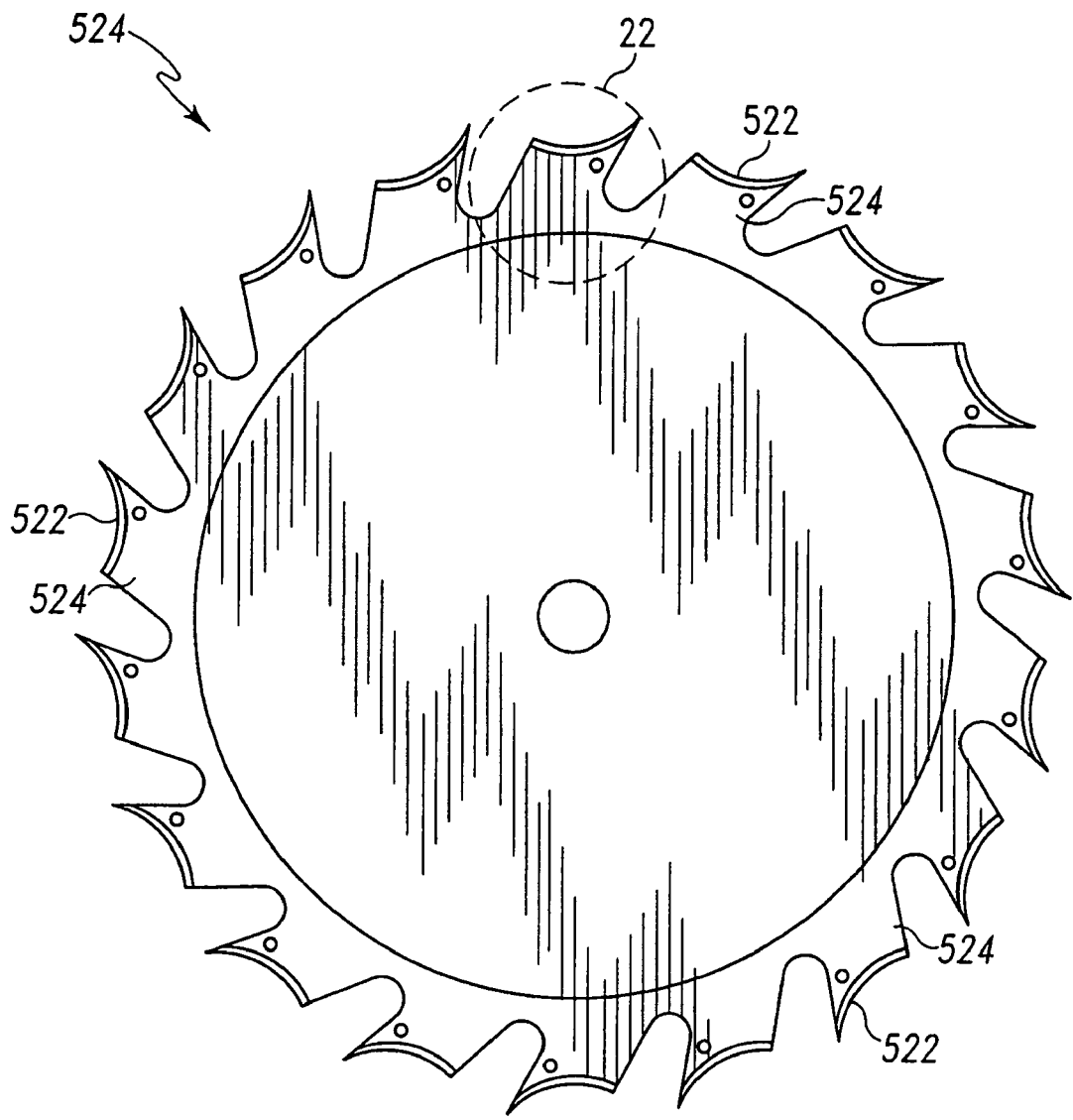
FIG. 21 is a side view of a circular saw blade.
Figure 22:
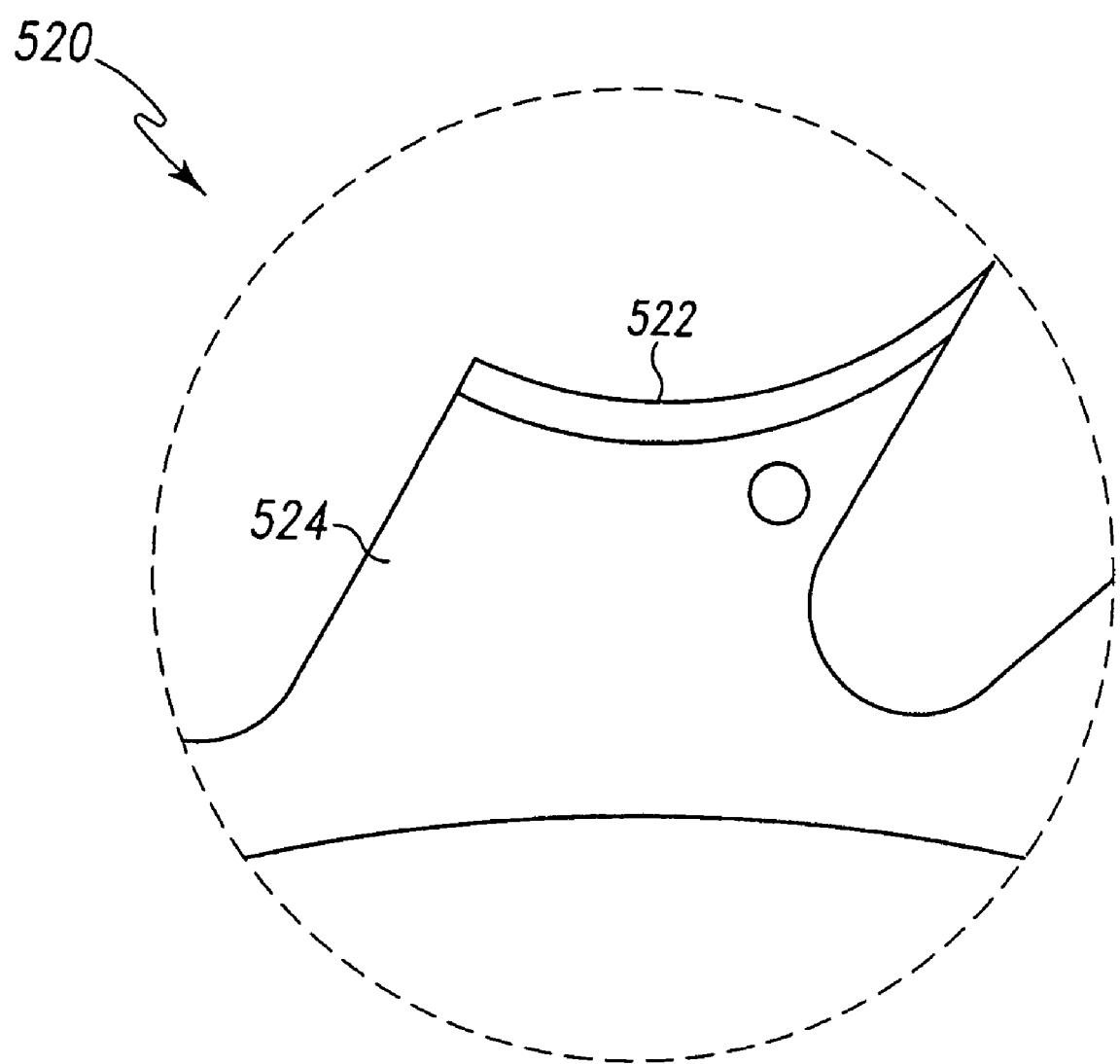
FIG. 22 is an enlarged view of a portion of the circular saw blade shown in FIG. 21.

In some embodiments, a removable blade may be configured to fit on other types of cutting tools. For example, as shown in FIG. 19, a removable blade 502 may be positioned on a cutting edge 504 of a flat boring bit or a spade bit 500. Alternatively, as shown FIG. 20, a removable blade 512 may be positioned on a tip 514 of a twist bit 510. Alternatively, as shown in FIGS. 21 and 22, a removable blade 522 may be positioned on at least some cutting blades 524 of a circular saw blade 520. Similar to the removable blade 444 illustrated in FIGS. 13-18, if any of the removable blades 502, 512, 522 become damaged or worn, an operator may simply remove the damaged or worn blades 502, 512, 522 and replace the damaged or worn blades 502, 512, 522 with new blades.

Figure 23:
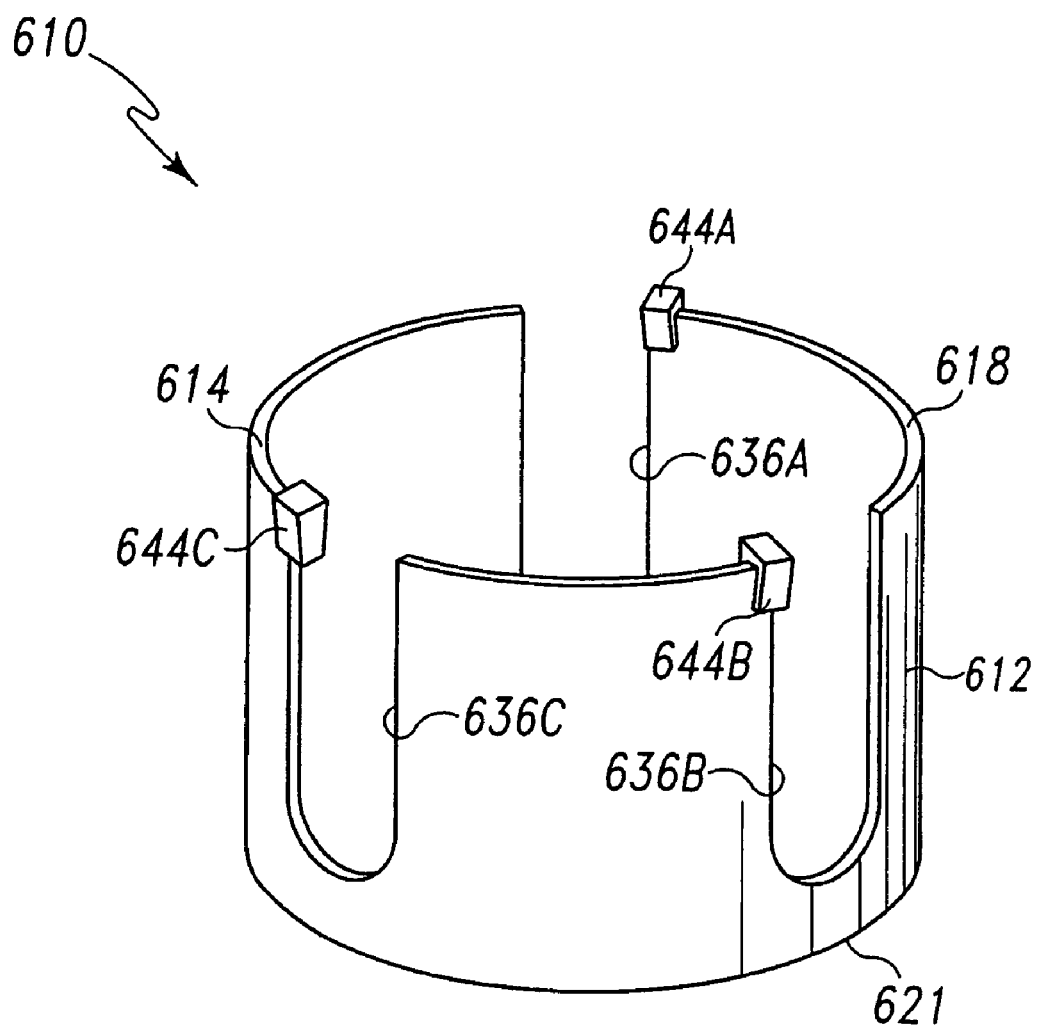
FIG. 23 is a perspective view of a cutting tool according to another alternate embodiment of the present invention.

FIGS. 23-24C illustrate an alternate embodiment of a cutting tool 610 according to the present invention. The cutting tool 610 shown in FIGS. 23-24C is similar in many ways to the illustrated embodiments of FIGS. 1-18 described above. Accordingly, with the exception of mutually inconsistent features and elements between the embodiment of FIGS. 23-24C and the embodiments of FIGS. 1-18, reference is hereby made to the description above accompanying the embodiments of FIGS. 1-18 for a more complete description of the features and elements (and the alternatives to the features and elements) of the embodiment of FIGS. 23-24C. Features and elements of FIGS. 23-24C corresponding to features and elements in the embodiments of FIGS. 1-18 are numbered in the 600 series.

In the illustrated embodiment of FIGS. 23-24C, the cutting tool 610 includes a first gullet 636A, a second gullet 636B, and a third gullet 636C spaced circumferentially around the body 612. As shown in FIG. 23, each gullet 636A, 636B, 636C can be spaced regularly (e.g., approximately 120 degrees apart) around the circumference of the body 612 from the other gullets 636A, 636B, 636C and can be oriented at a perpendicular angle with respect to the base 621 of the cutting tool 610. In other embodiments, the gullets 636A, 636B, 636C can be spaced irregularly and/or can be oriented at a non-perpendicular angle with respect to the base 621 of the cutting tool 610. In yet other embodiments, the 636A, 636B, 636C can be spaced asymmetrically around the circumference of the body 612.

In some embodiments, such as the embodiment of FIGS. 23-24C, cutting blades 644 are supported on the first end 614 of the body 612 adjacent to each of the first, second, and third gullets 636A, 636B, 636C. As shown in FIGS. 24A-24C, each cutting blade 644 can include an outer tip 688 positioned radially outwardly from the rim 618, an inner tip 690 positioned radially inwardly from the rim 618, and a cutting edge 692 extending between the outer tip 688 and the inner tip 690. In the illustrated embodiment, the cutting edges 692 are generally flat. In other embodiments, the cutting edges 692 may be concave, convex, jagged, irregular, or the like.

As shown in FIG. 24A, the outer tip 688A of the first cutting blade 644A is relatively higher (i.e., further from the base 621) than the inner tip 690A such that the first cutting blade 644A is beveled inwardly. In other words, the cutting edge 692A slopes towards the base 621 from the outer tip 688A to the inner tip 690A. In the embodiment illustrated in FIG. 23, the cutting edge 692A of the first cutting blade 644A is sloped such that the inner tip 690A is higher than the rim 618 of the cutting tool 610. In other embodiments, the cutting edge 692A may be sloped a lesser or greater amount such that the inner tip 690A is even higher than, substantially equal to, or below the rim 618.

As shown in FIG. 24B, the outer tip 688B of the second cutting blade 644B is at substantially the same height as the inner tip 690B such that the cutting edge 692B of the second cutting blade 644B is substantially parallel to the base 621. In the embodiment illustrated in FIG. 22, the second cutting blade 644B is configured such that the cutting edge 692B of the second cutting blade 644B is at a height (i.e., distance from the base 621) between the outer tip 688A and the inner tip 690A of the first cutting blade 644A. In other embodiments, the cutting edge 692B of the second cutting blade 644B may be positioned at a height substantially equal to the height of the outer tip 688A or the inner tip 690A of the first cutting blade 644A, or at a height substantially below the height of the inner tip 690A.

As shown in FIG. 24C, the outer tip 688C of the third cutting blade 644C is relatively lower (i.e., closer to the base 621) than the inner tip 690C such that the second cutting blade 644C is beveled outwardly. In other words, the cutting edge 692C slopes towards the base 621 from the inner tip 690C to the outer tip 688C. In the embodiment illustrated in FIG. 23, the cutting edge 629C of the third cutting blade 644C is sloped such that the outer tip 688C is higher than the rim 618 of the cutting tool 610. In other embodiments, the cutting edge 692C may be sloped a lesser or greater amount such that the outer tip 688C is even higher than, substantially equal to, or below the rim 618. Furthermore, as shown in FIG. 23, the outer tip 688C of the third cutting blade 644C can be at substantially the same height as the inner tip 690A of the first cutting blade 644A, and the inner tip 690C of the third cutting blade 644C can be at substantially the same height as the outer tip 688A of the first cutting blade 644A. In other embodiments, some or all of the inner and outer tips 688, 690 of the first, second, and third cutting blades 644 can be at substantially similar or different heights.

FIGS. 25A-25D illustrate a portion of a workpiece 104 cut using the cutting tool 610 shown in FIGS. 23-24C. For example, FIG. 25A illustrates a cross-section of the workpiece 104 having a cut-out portion 106A that can result from using the first cutting blade 644A, FIG. 25B illustrates a cross-section of the workpiece 104 having a cut-out portion 106B that can result from using the second cutting blade 644B, and FIG. 25C illustrates a cross-section of the workpiece 610 having a cut-out portion 106C that can result from using the third cutting blade 644C. A resultant cut-out portion 106D of the workpiece 104 using all three cutting blades 644A, 644B, 644C, such as, for example, by using the cutting tool 610 illustrated in FIG. 22, is shown in FIG. 25D.

In some embodiments, each of the three cutting blades 644A, 644B, 644C has a different cutting profile. Alternatively or in addition, each of three cutting blades 644A, 644B, 644C can remove a substantially equal portion of the workpiece during cutting such that each of the three cutting blades 644A, 644B, 644C experiences substantially similar wear and loading during cutting, thereby maximizing tool life and maintaining a desired tool balance during cutting.

FIGS. 26-28B illustrate an alternate embodiment of a cutting tool 710 according to the present invention. The cutting tool 710 shown in FIGS. 26-28B is similar in many ways to the illustrated embodiments of FIGS. 1-18 and 23-24C described above. Accordingly, with the exception of mutually inconsistent features and elements between the embodiment of FIGS. 26-28B and the embodiments of FIGS. 1-18 and 23-24C, reference is hereby made to the description above accompanying the embodiments of FIGS. 1-18 and 23-24C for a more complete description of the features and elements (and the alternatives to the features and elements) of the embodiment of FIGS. 26-28B. Features and elements of FIGS. 26-28B corresponding to features and elements in the embodiments of FIGS. 1-18 and 23-24C are numbered in the 700 series.

In the illustrated embodiment of FIGS. 26-28B, the cutting tool 710 includes a spade bit 730, a first gullet 736A, a second gullet 736B, a third gullet 736C, and a fourth gullet 736D. The spade bit 730 includes a cutting edge 794, a spade body 795, and a drive shaft 796. The spade body 795 and the drive shaft 796 may be, for example, cylindrical, rectangular, octagonal, hexagonal, square, oblong, or any combination thereof. In the embodiment illustrated, the cutting edge 794 has a width that is substantially greater than a width of the drive shaft 796. The spade body 795 serves as a transition between the cutting edge 794 and the drive shaft 796 and, as such, includes a first portion 797 having a width substantially equal to the width of the cutting edge 794 and a second portion 798 having a width substantially equal to the width of the drive shaft 796.

Figure 27:
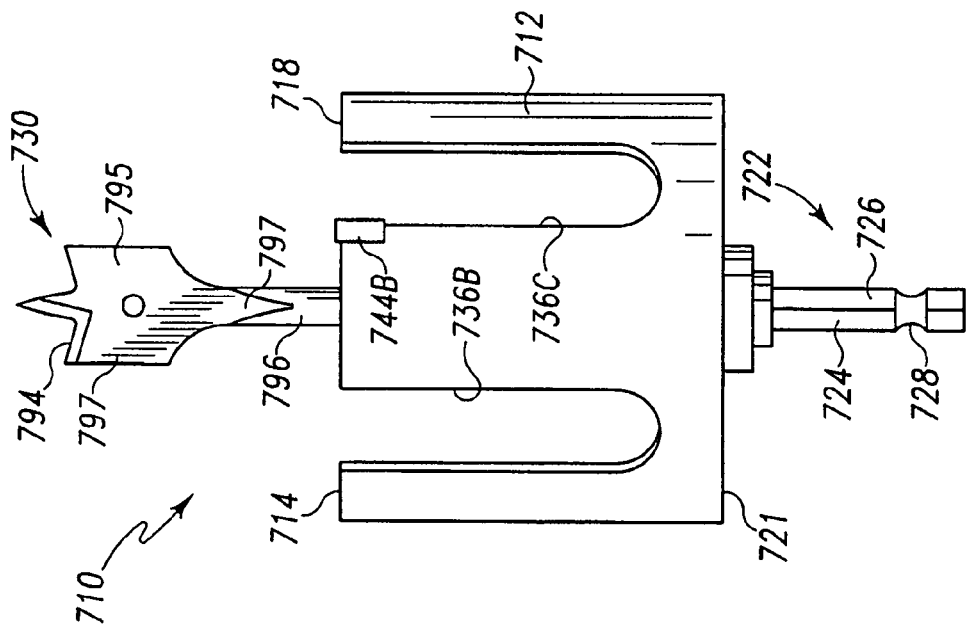
FIG. 27 is a side view of the cutting tool shown in FIG. 26.
Figure 26:
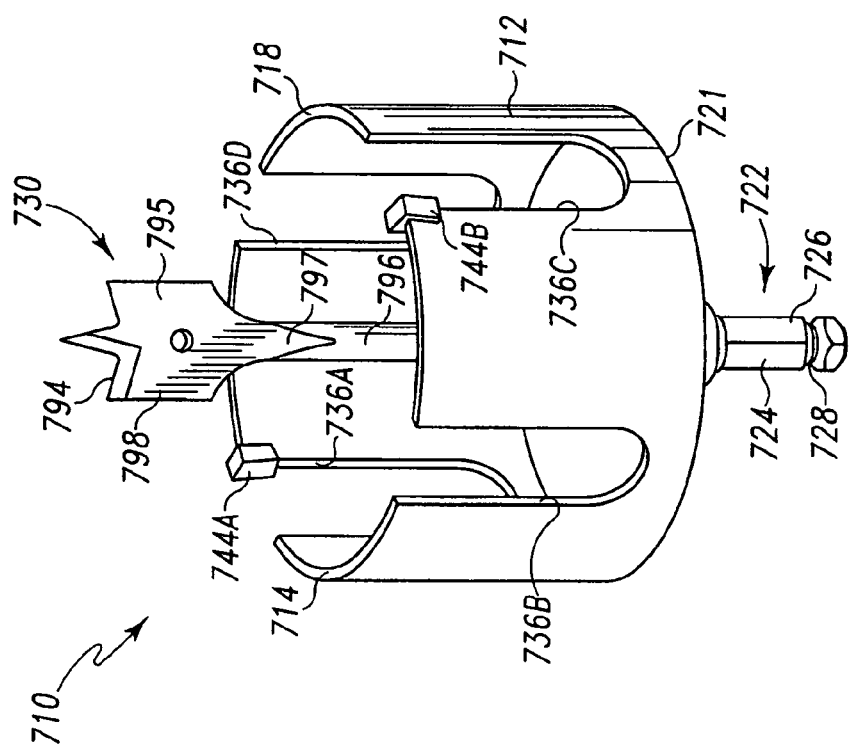
FIG. 26 is a perspective view of a cutting tool according to another alternate embodiment of the present invention.

In some embodiments, such as the embodiment illustrated in FIGS. 26 and 27, the drive shaft 796 extends beyond the rim 718 of the cutting tool 710 such that both portions 797, 798 of the spade body 795 are positioned above and exterior of the rim 718. In such an embodiment, an operator may completely remove a plug from the body 712 of the cutting tool 710 prior to the plug contacting the cutting edge 794 and first portion 797 of the spade bit 730. The operator may then more easily manipulate the plug after the plug has cleared the body 712 to separate the plug from the first portion 797 and the cutting edge 794 of the spade bit 730. In other embodiments, only a portion of the plug may clear the body 712 of the cutting tool 710 prior to the plug contacting the first portion 797 and/or the cutting edge 794 of the spade bit 730.

Figures 28A, 28B:
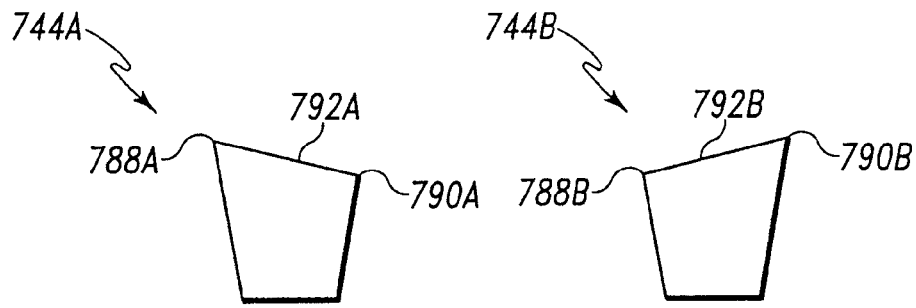
FIG. 28A is an enlarged view of a blade of the cutting tool shown in FIG. 26.
FIG. 28B is an enlarged view of another blade of the cutting tool shown in FIG. 26.

In the illustrated embodiment of FIGS. 26-28B, cutting blades 744 are supported on the first end 714 of the body 712 adjacent to each of the first and third gullets 736A, 736C. As shown in FIG. 28A, the outer tip 788A of the first cutting blade 744A is relatively higher than the inner tip 790A such that the first cutting blade 744A is beveled inwardly, similar to the first cutting blade 644A illustrated in FIG. 23A. As shown in FIG. 28B, the outer tip 788B of the second cutting blade 744B is relatively lower than the inner tip 790B such that the second cutting blade 744B is beveled outwardly, similar to the third cutting blade 644C illustrated in FIG. 23C.

Figures 29A, 29B, 29C:
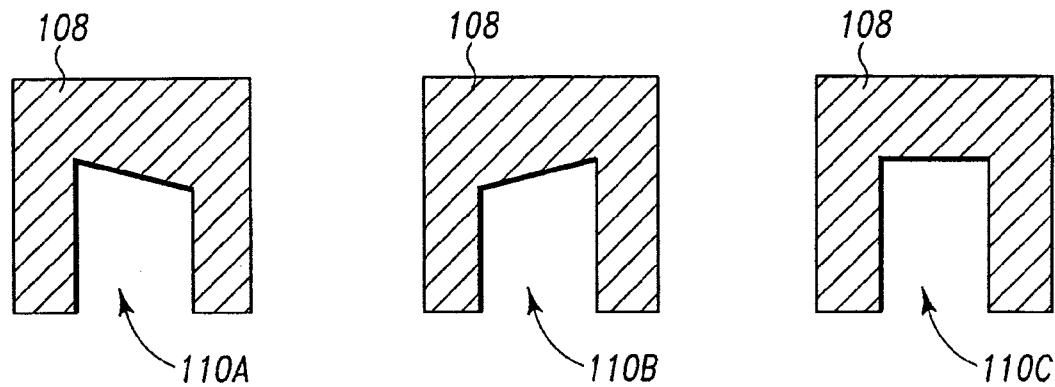
FIG. 29A is a cross-sectional view of a workpiece cut using the blade shown in FIG. 28A.
FIG. 29B is a cross-sectional view of a workpiece cut using the blade shown in FIG. 28B.
FIG. 29C is a cross-sectional view of a workpiece cut using both of the blades shown in FIGS. 28A and 28B.

FIGS. 29A-29B illustrate a portion of a workpiece 108 cut using the cutting tool 710 shown in FIGS. 26-28B. For example, FIG. 29A illustrates a cross-section of the workpiece 108 having a cut-out portion 110A that can result from using the first cutting blade 744A, and FIG. 29B illustrates a cross-section of the workpiece 108 having a cut-out portion 110B that can result from using the second cutting blade 744B. A resultant cut-out area 110C of the workpiece 108 using both cutting blades 744A, 744B, such as, for example by using the cutting tool 710 illustrated in FIGS. 26 and 27, is shown in FIG. 29C.

FIGS. 30A-32B illustrate an alternate embodiment of a cutting tool 810 according to the present invention. The cutting tool 810 as shown in FIGS. 30A-32B is similar in many ways to the illustrated embodiments of FIGS. 1-18, 23-24C, and 26-28B described above. Accordingly, with the exception of mutually inconsistent features and elements between the embodiment of FIGS. 30A-32B and the embodiments of FIGS. 1-18, 23-24C, and 26-28B, reference is hereby made to the description above accompanying the embodiments of FIGS. 1-18, 23-24C, and 26-28B for a more complete description of the features and elements (and the alternatives to the features and elements) of the embodiment of FIGS. 30A-32B. Features and elements in the embodiment of FIGS. 30A-32B corresponding to features and elements in the embodiments of FIGS. 1-18, 23-24C, and 26-28B are numbered in the 800 series.

In the illustrated embodiment of FIGS. 30A-32B, the cutting tool 810 includes a first gullet 836A and a second gullet 836B. Cutting blades 844 are supported on the first end 814 of the body 812 adjacent to each of the first and second gullets 836A, 836B. In some embodiments, the cutting blades 844 may include cutting edges 892 having inward bevels or outward bevels, or cutting edges 892 that are substantially parallel to the base 821 of the cutting tool 810.

Figures 32A, 32B:
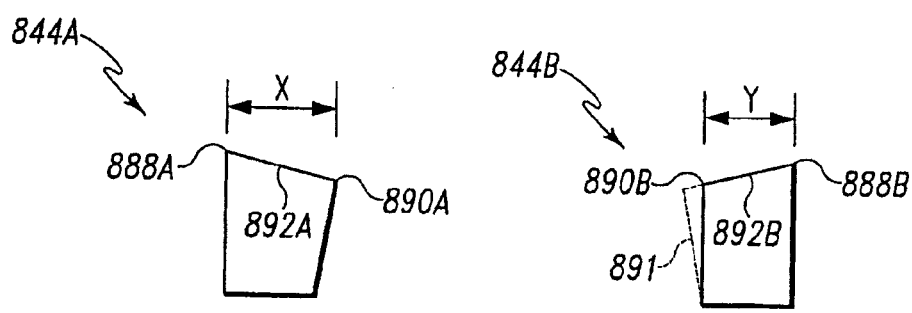
FIG. 32A is an enlarged view of a blade of the cutting tool shown in FIG. 30A.
FIG. 32B is an enlarged view of another blade of the cutting tool shown in FIG. 30A

As shown in FIG. 32A, the cutting edge 892A of the first cutting blade 844A has a width X. In some embodiments, such as the embodiment illustrated in FIG. 32B, the second cutting blade 844B can include a shortened inner tip 890B. As shown in FIG. 32B, due to the shortened inner tip 890B, the cutting edge 892B of the second cutting blade 844B has a width Y, which is substantially less than the width X of the cutting edge 892A of the first cutting blade 844A. The inner tip 890B of the second cutting blade 844B is considered "shortened" because a portion 891 of the inner tip 890B is removed from the second cutting blade 844B. In some embodiments, the inner tip 890B of the second cutting blade 844B may be, for example, ground, filed, cut, machined, or the like such that the inner tip 890B of the second cutting blade 844B does not extend radially inwardly as far as the inner tip 890A of the first cutting blade 844A. In other embodiments, the second cutting blade 844B can be formed without an inner tip 890B.

Referring to FIGS. 30B and 31, a cutting line 899 of the first cutting blade 844A is shown. The cutting line 899 indicates approximately where the inner tip 890A of the first cutting blade 844A cuts a workpiece. In the illustrated embodiment, the cutting line 899 is positioned radially inwardly from the shaved inner tip 890B of the second cutting blade 844B. In other embodiments, the cutting line 899 may be a greater or a lesser distance from the shaved inner tip 890B than the amount illustrated. In still other embodiments, three or more cutting blades 844 supported on the first end 814 of the body 812 may define cutting lines that each project radially inwardly by different amounts.

Because the first cutting blade 844A cuts a workpiece along the cutting line 899, the plug created has a diameter that is less than a distance C between the inner tip 890A of the first cutting blade 844A and the shortened inner tip 890B of the second cutting blade 844B. The smaller diameter plug allows an operator to remove the plug from the cutting tool 810 more easily than if one of the cutting blades 844 did not have a shortened inner tip.

FIGS. 33A-34D illustrate an alternate embodiment of a cutting tool 910 according to the present invention. The cutting tool 910 shown in FIGS. 33A-34D is similar in many ways to the illustrated embodiments of FIGS. 1-18, 23-24C, 26-28B, and 30A-32B described above. Accordingly, with the exception of mutually inconsistent features and elements between the embodiment of FIGS. 33A-34D and the embodiments of FIGS. 1-18, 23-24C, 26-28B, and 30A-32B, reference is hereby made to the description above accompanying the embodiments of FIGS. 1-18, 23-24C, 26-28B, and 30A-32B for a more complete description of the features and elements (and the alternative to the features and elements) of the embodiment of FIGS. 33A-34D. Features and elements in the embodiment of FIGS. 33A-34D corresponding to features and elements in the embodiments of FIGS. 1-18, 23-24C, 26-28B, and 30A-32B are numbered in the 900 series.

In the illustrated embodiment of FIGS. 33A-34D, the cutting tool 910 includes a spade bit 930, a first long gullet 936A, a second long gullet 936B, a first short gullet 936C, and a second short gullet 936D. The spade bit 930 includes a cutting edge 994, an elongated spade body 995, and a drive shaft 996. In some embodiments, such as the embodiment illustrated, the spade body 995 is generally planar and the drive shaft 996 has a generally circular cross-sectional shape. In other embodiments, the spade body 995 and/or the drive shaft 996 may take other forms and may have other cross-sectional shapes such as, for example, octagonal, hexagonal, square, oblong, or the like. In the illustrated embodiment, the spade body 995 has a width that is substantially equal to a width (e.g., a diameter if the drive shaft 996 has a generally circular cross-sectional shape) of the drive shaft 996, while the cutting edge 994 has a width substantially greater than both the spade body 995 and the drive shaft 996.

As shown in FIGS. 33A-34D, the long gullets 936A, 936B can be spaced apart by about 180 degrees circumferentially around the body 912. The long gullets 936A, 936B are referred to herein as "long" because the long gullets 936A, 936B open on the first end 914 of the body 912 and extend to the second end 916 of the body 912 along substantially the entire height of the body 912 measured between the first and second ends 914, 916 of the body 912. In the illustrated embodiment, cutting blades 944 are supported on the first end 914 of the body 912 adjacent to each of the first and second long gullets 936A, 936B.

The short gullets 936C, 936D can also be spaced about 180 degrees circumferentially around the body 912. In some embodiments, the long gullets 936A, 936B and the short gullets 936C, 936D may be spaced at regular or irregular intervals. The short gullets 936C, 936D are referred to herein as "short" because the short gullets 936C, 936D open on the first end 914 of the body 912 and extend along substantially less than the entire height of the body 912 measured between the first and second ends 914, 916 of the body 912. In the illustrated embodiment, the short gullets 936C, 936D extend slightly past a lower edge of the cutting blades 944 such that an operator can insert his fingers through the first and second short gullets 936C, 936D and into a top portion of the body 912 without contacting the cutting blades 944.

FIGS. 35A-35D illustrate an alternate embodiment of a cutting tool 1010 according to the present invention. The cutting tool 1010 shown in FIGS. 35A-35D is similar in many ways to the illustrated embodiments of FIGS. 1-18, 23-24C, 26-28B, and 30A-34D described above. Accordingly, with the exception of mutually inconsistent features and elements between the embodiment of FIGS. 35A-33D and the embodiments of FIGS. 1-18, 23-24C, 26-28B, and 30A-34D, reference is hereby made to the description above accompanying the embodiments of FIGS. 1-18, 23-24C, 26-28B, and 30A-34D for a more complete description of the features and elements (and the alternatives to the features and elements) of the embodiment of FIGS. 35A-35D. Features and elements in the embodiment of FIGS. 35A-35D corresponding to features and elements in the embodiments of FIGS. 1-18, 23-24C, 26-28B, and 30A-34D are numbered in the 1000 series.

In the illustrated embodiment of FIGS. 35A-35D, the cutting tool 1010 includes a spade bit 1030, a first gullet 1036A, and a second gullet 1036B. The spade bit 1030 can be substantially similar to the spade bit 930 described above with reference to FIGS. 33A-34D. In addition, the spade bit 1030 can include a removable blade 1031 on the cutting edge 1094 similar to the spade bit 500 and the removable blade 502 described above with reference to FIG. 19.

As shown in FIGS. 35A-35D, the gullets 1036A, 1036B are spaced approximately 180 degrees apart around the circumference of the body 1012. In other embodiments, the gullets 1036A, 1036B may be spaced a lesser amount such as, for example, 90 degrees apart around the circumference of the body 1012. In some embodiments, such as the illustrated embodiment of FIGS. 35A-35D, cutting blades 1044 are supported on the first end 1014 of the body 1012 adjacent to each of the first and second gullets 1036A, 1036B. The cutting blades 1044 may be beveled similar to the cutting blades 744A, 744B illustrated in FIGS. 28A and 28B, or may have other orientations and configurations with respect to the base 1021 of the body 1012.

The embodiments described above and illustrated in the figures are presented by way of example only and are not intended as a limitation upon the concepts and principles of the present invention.

Various features and advantages of the invention are set forth in the following claims.

What is claimed is:

1. A cutting tool comprising:
   a tool body having a first end engageable with a workpiece and a second end engageable with a spindle of a power tool, the tool body including first, second, and third gullets opening through the first end of the tool body and being spaced asymmetrically around a circumference of the first end; and
   a blade extending outwardly from the first end of the tool body adjacent to the first gullet,
   wherein the first gullet is oriented at an acute angle with respect to the second end of the tool body, and at least one of the second gullet and the third gullet is oriented at a generally perpendicular angle with respect to the second end of the tool body.

2. The cutting tool of claim 1, wherein the second and third gullets are spaced around the circumference of the first end of the tool body by about 180 degrees and provide substantially unobstructed access to an interior of the tool body for plug removal.

3. The cutting tool of claim 1, further comprising a fourth gullet opening through the first end of the tool body.

4. The cutting tool of claim 3, wherein the blade is a first blade, and further comprising a second blade extending outwardly from the first end of the tool body adjacent to the fourth gullet.

5. The cutting tool of claim 4, wherein the second and third gullets are spaced about 180 degrees apart around the circumference of the first end of the tool body, and wherein the first and fourth gullets are spaced about 180 degrees apart around the circumference of the first end of the tool body.

6. The cutting tool of claim 1, further comprising an opening extending radially through the tool body between two of the first, second, and third gullets.

7. The cutting tool of claim 1, wherein the blade is a first blade and includes a cutting edge having a first width, and further comprising a second blade extending outwardly from the first end of the tool body adjacent to the third gullet and including a cutting edge having a second width, the first width being greater than the second width.

8. The cutting tool of claim 1, wherein the blade includes a cutting edge sloping toward the second end of the tool body from a radially inner tip toward a radially outer tip.

9. The cutting tool of claim 8, wherein the blade is a first blade, and further comprising a second blade extending outwardly from the first end of the tool body and including a cutting edge sloping toward the second end of the tool body from a radially outer tip toward a radially inner tip.

10. The cutting tool of claim 1, further comprising a spade bit including a cutting edge and a drive shaft, the drive shaft extending outwardly from the tool body beyond the first end of the tool body, the cutting edge having a width greater than a width of the drive shaft.

11. The cutting tool of claim 1, wherein the cutting tool is a hole cutter.

12. The cutting tool of claim 11, wherein the cutting tool includes no more than three blades arranged along the first end of the tool body.

13. A cutting tool comprising:
   a tool body having a first end engageable with a workpiece and a second end engageable with a spindle of a power tool, the tool body including first, second, third, and fourth gullets opening through the first end of the tool body, the first gullet adjacent to and spaced a first distance from the second gullet, the second gullet adjacent to and spaced a second distance from the third gullet, the third gullet adjacent to and spaced the first distance from the fourth gullet, the fourth gullet adjacent to and spaced the second distance from the first gullet, the first distance being different from the second distance, the first and third gullets spaced about 180 degrees apart around a circumference of the first end, and the second and fourth gullets spaced about 180 degrees apart around the circumference of the first end, the tool body defining an axis extending between the first end and the second end, the first and third gullets being oriented at an acute angle relative to the axis, the second and fourth gullets extending generally parallel to the axis;
   a first blade extending outwardly from the first end of the tool body adjacent to the first gullet; and
   a second blade extending outwardly from the first end of the tool body adjacent to the third gullet,
   wherein a blade is not positioned adjacent to the second gullet and the fourth gullet.

14. The cutting tool of claim 13, wherein the first blade includes a cutting edge sloping toward the second end of the tool body from a radially inner tip toward a radially outer tip, and wherein the second blade includes a cutting edge sloping toward the second end of the tool body from a radially outer tip toward a radially inner tip.

15. The cutting tool of claim 13, wherein the first blade includes a cutting edge having a first width, and the second blade includes a cutting edge having a second width, the first width being greater than the second width.

16. The cutting tool of claim 13, wherein the second and third gullets are spaced around the circumference of the first end of the tool body by at least about 90 degrees, and wherein the first and fourth gullets are spaced around the circumference of the first end of the tool body by at least about 90 degrees.

17. The cutting tool of claim 13, wherein the second and fourth gullets provide substantially unobstructed access to an interior of the tool body for plug removal.

18. The cutting tool of claim 13, further comprising a spade bit including a cutting edge and a drive shaft, the drive shaft extending outwardly from the tool body beyond the first end of the tool body, the cutting edge having a width greater than a width of the drive shaft.

19. The cutting tool of claim 13, further comprising a spade bit including a spade body and a drive shaft, at least a portion of the spade body having a width substantially equal to a width of the drive shaft.

20. The cutting tool of claim 13, wherein the cutting tool is a hole cutter.

21. The cutting tool of claim 20, wherein the cutting tool includes no more than two blades arranged along the first end.

22. The cutting tool of claim 1, wherein the blade is a first blade, and further comprising a fourth gullet opening through the first end of the tool body, and a second blade extending outwardly from the first end of the tool body adjacent to the fourth gullet.

23. The cutting tool of claim 22, wherein the first gullet is adjacent to and spaced a first distance from the second gullet, and the second gullet is adjacent to and spaced a second distance from the third gullet, the first distance being different from the second distance.

24. The cutting tool of claim 23, wherein the third gullet is adjacent to and spaced the first distance from the fourth gullet, and the fourth gullet is adjacent to and spaced the second distance from the first gullet.

25. The cutting tool of claim 24, wherein the first and third gullets are spaced about 180 degrees apart around the circumference of the first end of the tool body, and wherein the second and fourth gullets are spaced about 180 degrees apart around the circumference of the first end of the tool body.

26. A hole cutter comprising:
a tool body having a first end engageable with a workpiece and a second end engageable with a spindle of a power tool, the tool body including first, second, third, and fourth gullets opening through the first end of the tool body, the first gullet adjacent to and spaced a first distance from the second gullet, the second gullet adjacent to and spaced a second distance from the third gullet, the third gullet adjacent to and spaced the first distance from the fourth gullet, the fourth gullet adjacent to and spaced the second distance from the first gullet, the first distance being different from the second distance, the first and third gullets spaced about 180 degrees apart around a circumference of the first end, and the second and fourth gullets spaced about 180degrees apart around the circumference of the first end;
a first blade extending outwardly from the first end of the tool body adjacent to the first gullet, the first blade including a cutting edge sloping toward the second end of the tool body from a radially inner tip toward a radially outer tip; and
a second blade extending outwardly from the first end of the tool body adjacent to the third gullet, the second blade including a cutting edge sloping toward the second end of the tool body from a radially outer tip toward a radially inner tip,
wherein a blade is not positioned adjacent to the second gullet and the fourth gullet.

* * * * *